US011477849B2

(12) United States Patent
Xu et al.

(10) Patent No.: US 11,477,849 B2
(45) Date of Patent: Oct. 18, 2022

(54) METHOD AND APPARATUS FOR COOPERATION AMONG DEVICES IN TRANSMISSIONS OVER A UU INTERFACE

(71) Applicants: Hua Xu, Ottawa (CA); Jianglei Ma, Ottawa (CA); Liqing Zhang, Ottawa (CA)

(72) Inventors: Hua Xu, Ottawa (CA); Jianglei Ma, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 16/939,672

(22) Filed: Jul. 27, 2020

(65) Prior Publication Data
US 2021/0037601 A1 Feb. 4, 2021

Related U.S. Application Data

(60) Provisional application No. 62/880,289, filed on Jul. 30, 2019.

(51) Int. Cl.
*H04B 7/026* (2017.01)
*H04W 88/04* (2009.01)
(Continued)

(52) U.S. Cl.
CPC ............ *H04W 88/04* (2013.01); *H04B 7/026* (2013.01); *H04W 72/1289* (2013.01); *H04W 92/10* (2013.01); *H04W 92/18* (2013.01)

(58) Field of Classification Search
None
See application file for complete search history.

(56) References Cited

U.S. PATENT DOCUMENTS 11,206,682 B2 * 12/2021 Christoffersson ....... H04W 4/06
2007/0002766 A1 * 1/2007 Park .................... H04B 7/15592
370/254
(Continued)

FOREIGN PATENT DOCUMENTS

CN 108512576 A 9/2018
WO 2018113678 A1 6/2018

OTHER PUBLICATIONS

Huawei, Sidelink Support & Enhancements for NR, Aug. 2016, 3GPP TSG RAN WG1 Meeting #86, R1-167207, p. 1-7. (Year: 2016).*

(Continued)

*Primary Examiner* — Nicholas Sloms

(57) ABSTRACT

Methods and apparatuses are described for cooperation of two or more devices to improve the transmissions over a Uu interface. A source receives or transmits an indicator indicating a first mode of two modes of cooperation between the source apparatus and at least a first cooperating device. The two modes of cooperation includes a joint communication mode and a relay mode of cooperation. If the first mode is the joint communication mode, at least a portion of the data, intended for the intended recipient, is transmitted to at least the first cooperating device to be further transmitted by the first cooperating device to the intended recipient. A same or different portion of the data is transmitted to the intended recipient or to a second cooperating device to be further transmitted by the second cooperating device to the intended recipient.

20 Claims, 16 Drawing Sheets

(51) Int. Cl.
*H04W 72/12* (2009.01)
*H04W 92/18* (2009.01)
*H04W 92/10* (2009.01)

(56) References Cited

U.S. PATENT DOCUMENTS

| | | | | |
|---|---|---|---|---|
| 2007/0217432 | A1* | 9/2007 | Molisch | H04B 7/026 370/400 |
| 2011/0273999 | A1* | 11/2011 | Nagaraja | H04L 1/0076 370/252 |
| 2012/0314609 | A1* | 12/2012 | Chang | H04B 7/2606 370/252 |
| 2014/0098731 | A1* | 4/2014 | Maaref | H04W 72/121 370/312 |
| 2014/0171062 | A1* | 6/2014 | Fallgren | H04W 40/22 455/422.1 |
| 2014/0171094 | A1 | 6/2014 | Noh et al. | |
| 2015/0230224 | A1* | 8/2015 | Maaref | H04L 5/0035 455/451 |
| 2016/0338095 | A1* | 11/2016 | Faurie | H04W 28/0278 |
| 2017/0013577 | A1* | 1/2017 | Berggren | H04W 56/002 |
| 2017/0171899 | A1* | 6/2017 | Seo | H04W 28/08 |
| 2017/0318586 | A1* | 11/2017 | Wang | H04W 52/42 |
| 2017/0339530 | A1* | 11/2017 | Maaref | H04W 4/06 |
| 2018/0124674 | A1* | 5/2018 | Vutukuri | H04W 36/30 |
| 2018/0139741 | A1* | 5/2018 | Wang | H04L 45/74 |
| 2018/0176955 | A1* | 6/2018 | Salem | H04W 52/08 |
| 2018/0255611 | A1* | 9/2018 | Li | H04W 92/18 |
| 2019/0253927 | A1* | 8/2019 | Mok | H04W 28/0226 |
| 2020/0100325 | A1* | 3/2020 | Chang | H04W 76/14 |
| 2020/0296745 | A1* | 9/2020 | Inokuchi | H04W 72/121 |
| 2020/0359435 | A1* | 11/2020 | Raghavan | H04L 5/0051 |

OTHER PUBLICATIONS

ZTE, Report of Email Discussion, Aug. 2016, 3GPP TSG RAN WG2 Meeting #91, R2-153764, pp. 1-41. (Year: 2015).*
Ma, Jinglei et al. U.S. Appl. No. 62/835,725. Uplink Cooperative Multi-User Equipment (UE) Multiple-Input Multiple-Output (MMO).
Huawei, HiSilicon, Discussion on network assisted UE cooperation for Rel-17. 3GPP TSG RAN Meeting #83, Shenzhen, China, Mar. 18-21, 2019, RP-190491, 4 pages.

* cited by examiner

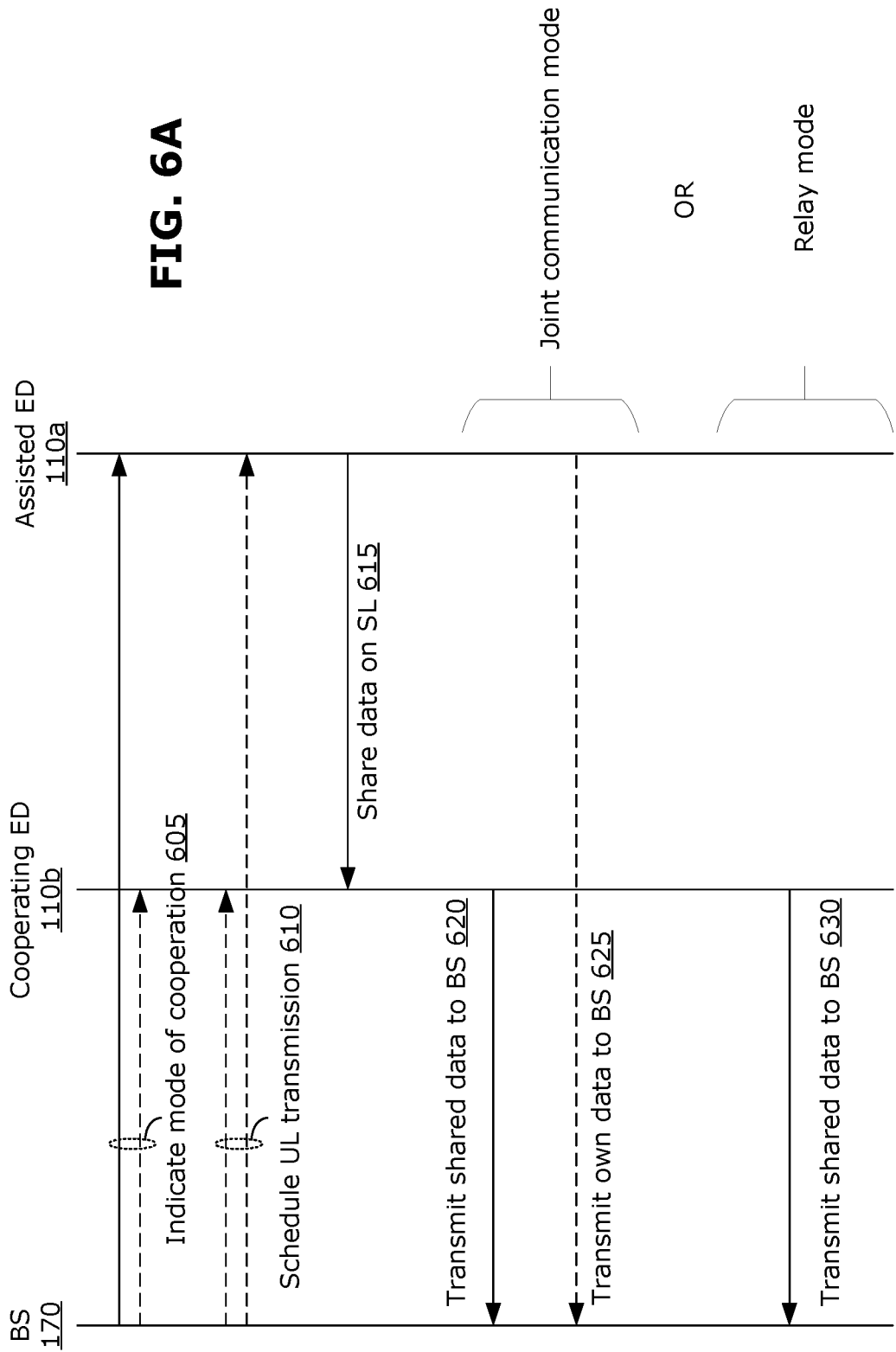

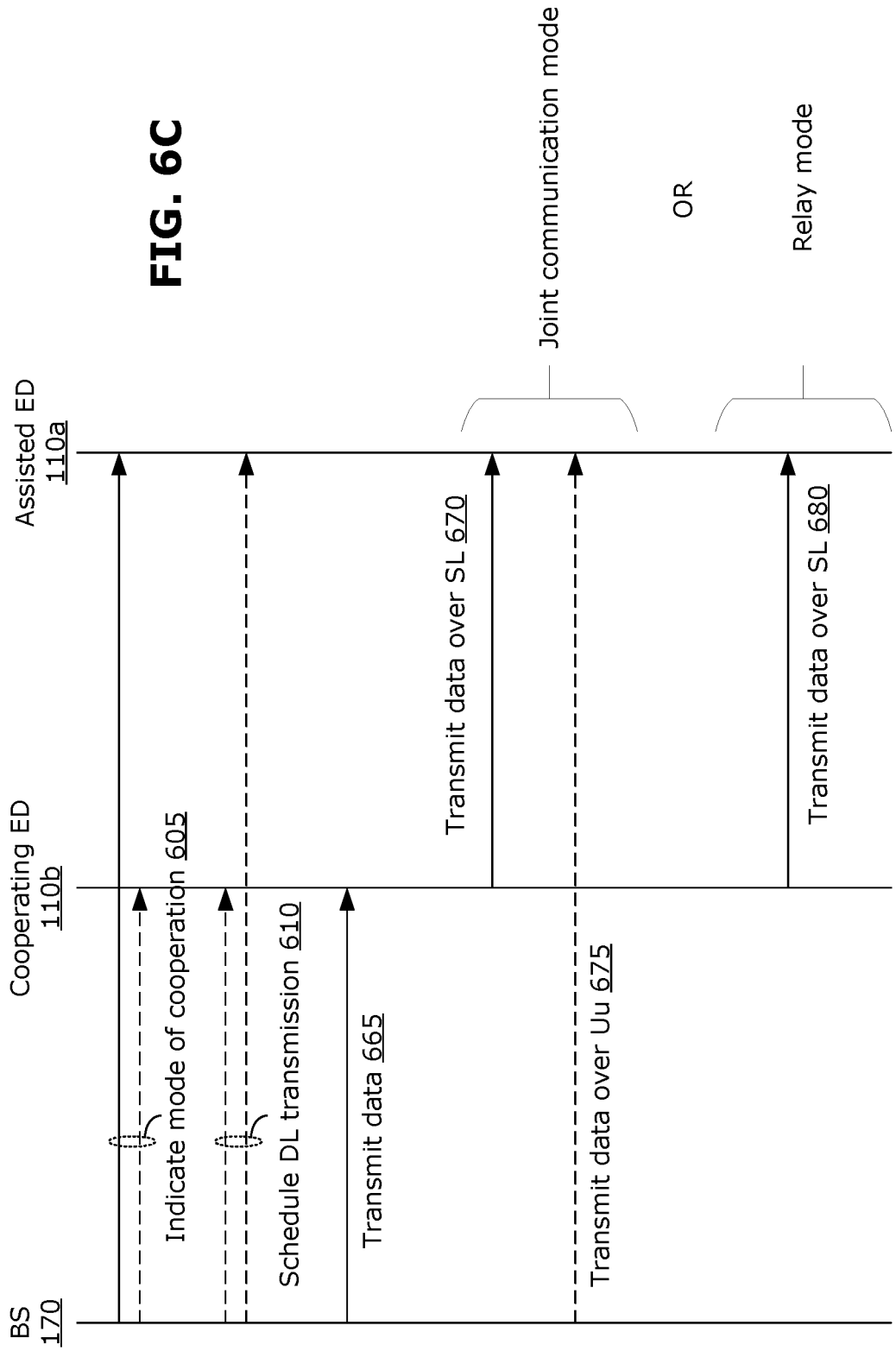

METHOD AND APPARATUS FOR COOPERATION AMONG DEVICES IN TRANSMISSIONS OVER A UU INTERFACE

CROSS-REFERENCE TO RELATED APPLICATIONS

The present disclosure claims priority from U.S. provisional patent application No. 62/880,289, entitled "A METHOD AND APPARATUS FOR COOPERATION AMONG DEVICES IN TRANSMISSIONS OVER A UU INTERFACE", filed Jul. 30, 2019, the entirety of which is hereby incorporated by reference.

FIELD

The present disclosure is related to methods and apparatuses for wireless communication, in which two or more electronic devices (EDs) cooperate to improve the transmissions over a Uu interface.

BACKGROUND

In current wireless systems (e.g., LTE networks) the wireless network can include nodes that serve as relays. A relay can be used to help improve the coverage of wireless communications. Conventionally, a relay node is mainly deployed by operators at a fixed site. There are different types of relays, including more simple relays (e.g., repeaters) and more complicated relays (e.g., L3 relays).

Techniques for device-to-device (D2D) communication (e.g., wireless communications over a sidelink (SL) interface between two EDs) have been studied. These techniques include newer types of communications, such as vehicle-to-everything (V2X) communications.

With the increasing number and density of EDs being deployed, such as in growing Internet of Things (IoT) systems and 5G wireless systems, there is a desire to utilize SL communications to help improve transmissions over the interface between the device and the network (e.g., transmissions over a Uu interface).

SUMMARY

In various examples, the present disclosure may enable an ED to, when cooperation mode is enabled, switch between operation in relay mode and joint communication mode. In some examples, an ED may operate in relay mode when cooperating with a first other ED and operate in joint communication mode when cooperating with a second other ED and possibly a third (or more) other ED. The examples disclosed herein may help to enable cooperation among EDs, which may help to improve system performance, in terms of coverage and throughput.

In some example aspects, the present disclosure describes a method, at a source apparatus. The method includes: receiving or transmitting an indicator indicating a first mode of two modes of cooperation between the source apparatus and at least a first cooperating device, wherein the two modes of cooperation comprises a joint communication mode of cooperation and a relay mode of cooperation. If the first mode is the joint communication mode of cooperation, the method further includes: transmitting at least a portion of the data, intended for the intended recipient, to at least the first cooperating device to be further transmitted by the first cooperating device to the intended recipient; and transmitting at least a same or different portion of the data to the intended recipient or to a second cooperating device to be further transmitted by the second cooperating device to the intended recipient.

In any of the examples, the method may include, if the first mode is the relay mode of cooperation: transmitting data, intended for the intended recipient, to a first cooperating device to be further transmitted by the first cooperating device to the intended recipient.

In any of the examples, the indicator may be transmitted in one or more of: a radio resource control (RRC) signal, a downlink control information (DCI) message, a sidelink control information (SCI) message, a RRC signal over a sidelink physical layer (PC5), or a packet transmitted over a sidelink interface.

In any of the examples, the method may include: enabling the relay mode of cooperation at the first cooperating device by: in absence of transmitting the indicator, transmitting, to the first cooperating device only, the data originating from the source apparatus.

In any of the examples, the method may include, if the first mode is the joint communication mode of cooperation: splitting or duplicating the data into two or more portions of data; transmitting one of the two or more portions of data to the first cooperating device, to be transmitted by the first cooperating device to the intended recipient; and performing at least one of: transmitting another of the two or more portions of data to the second cooperating device, to be transmitted by the second cooperating device to the intended recipient; or transmitting the other of the two or more portions of data to the intended recipient.

In any of the examples, splitting or duplicating the data may be performed by one of: splitting or duplicating the data at a packet data convergence protocol (PDCP) layer; splitting or duplicating the data at a media access control (MAC) layer; or splitting or duplicating the data at a physical (PHY) layer.

In some example aspects, the present disclosure describes a method, at a cooperating device. The method includes: receiving a first indicator enabling a joint communication mode of cooperation with a first source apparatus; receiving at least a portion of first data from the first source apparatus; receiving at least a portion of second data from a second source apparatus; and transmitting at least the portion of first data and at least the portion of second data to at least one intended recipient.

In any of the examples, the method may include: receiving a second indicator enabling a relay mode of cooperation with the second source apparatus; wherein at least the portion of first data may be transmitted using the joint communication mode of cooperation, and at least the portion of second data is transmitted using the relay mode of cooperation.

In any of the examples, the method may include: in absence of any indicator indicating a mode of cooperation with the second source apparatus, transmitting at least the portion of second data using a relay mode of cooperation by default.

In any of the examples, the intended recipient for at least the portion of first data may be different from the intended recipient for at least the portion of second data.

In any of the examples, the transmitting may include multiplexing at least the portion of first data and at least the portion of second data over respective transmission resources.

In any of the examples, the transmitting may include multiplexing at least the portion of first data and at least the portion of second data over at least one of the following:

different codewords; different transport blocks; different layers; different code block groups; or different radio bearers.

In some example aspects, the present disclosure describes a method, at a recipient apparatus. The method includes: receiving or transmitting an indicator indicating a first mode of two modes of cooperation, wherein the two modes of cooperation comprises a joint communication mode of cooperation and a relay mode of cooperation. If the first mode is the joint communication mode of cooperation, the method further includes: receiving, from a first cooperating device, at least a portion of data originating from a source apparatus; and receiving, from at least another device, a different portion of data originating from the source apparatus or a duplicate of at least the portion of data originating from the source apparatus.

In any of the examples, the method may include, if the first mode is the relay mode of cooperation: receiving, from the first cooperating device, data originating from the source apparatus.

In any of the examples, the indicator may be transmitted to at least one of the first cooperating device, the source apparatus, or a second cooperating device.

In any of the examples, the indicator may be transmitted in one or more of: a radio resource control (RRC) signal, a downlink control information (DCI) message, a sidelink control information (SCI) message, a RRC signal over a sidelink physical layer (PC5), or a packet transmitted over a sidelink interface.

In any of the examples, the indicator may be transmitted to enable the joint communication mode, and in absence of the indicator the relay mode may be enabled at the first cooperating device by default.

In any of the examples, the indicator may include information indicating transmission resources to be used for transmitting at least the portion of data originating from the source apparatus.

In any of the examples, the portion of data received from the source apparatus and the different or duplicate portion of data received from the other device may be split or duplicated at a packet data convergence protocol (PDCP) layer; at a media access control (MAC) layer; or at a physical (PHY) layer.

In any of the examples, the indicator may be received from the source apparatus, the first cooperating device, or the other device.

In some aspects, the present disclosure describes a source apparatus including a non-transitory memory storage storing instructions, and one or more processors in communication with the memory. The one or more processors execute the instructions to implement steps in accordance with any of the methods described above.

In some aspects, the present disclosure describes a cooperating apparatus including a non-transitory memory storage storing instructions, and one or more processors in communication with the memory. The one or more processors execute the instructions to implement steps in accordance with any of the methods described above.

In some aspects, the present disclosure describes a base station including a non-transitory memory storage storing instructions, and one or more processors in communication with the memory. The one or more processors execute the instructions to implement steps in accordance with any of the methods described above.

BRIEF DESCRIPTION OF THE DRAWINGS

Reference will now be made, by way of example, to the accompanying drawings which show example embodiments of the present application, and in which:

FIGS. 6A-6D are signaling diagrams illustrating example data flows for coordination of cooperating EDs;

Similar reference numerals may have been used in different figures to denote similar components.

DESCRIPTION OF EXAMPLE EMBODIMENTS

Figure 1:
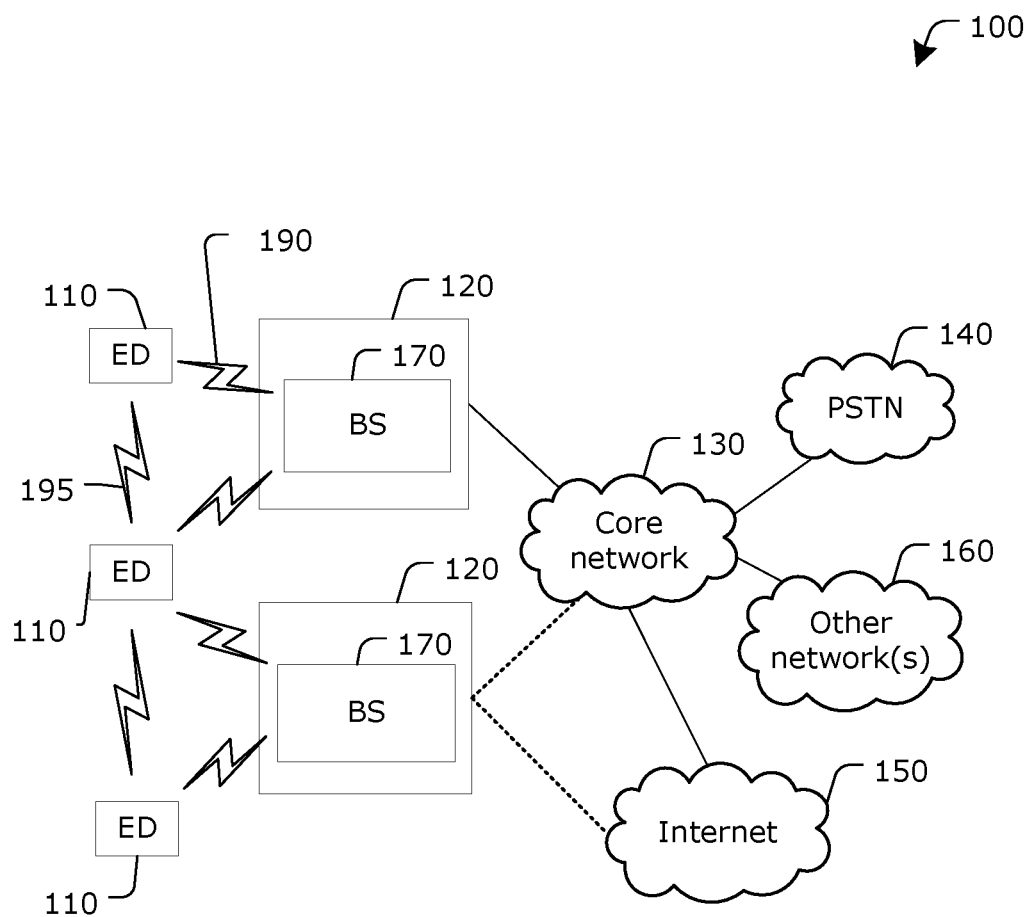
FIG. 1 is a schematic diagram of an example communication system suitable for implementing examples described herein.

Conventional wireless techniques have focused on the use of sidelink (SL) for device-to-device (D2D) communications. The use of SL to enable cooperation among electronic devices (EDs) (including cooperation with EDs operating in relay mode), for the intention of improving communications between EDs and the network (e.g., over the Uu interface), have not been well studied. The present disclosure describes examples for enabling ED cooperation and managing different modes of ED cooperation, which may help to enhance the system throughout, coverage and/or capacity. Improvements in latency and/or reliability may also be achieved in some examples. The present disclosure describes examples for managing coordination and cooperation among multiple EDs, in terms of both transmission and reception (e.g., for improving both uplink (UL) and downlink (DL) communications). The disclosed examples may be useful for current and future wireless technologies, for example including vehicle-to-everything (V2X), enhanced mobile broadband (eMBB), and ultra-reliable low-latency communication (URLLC), among other possibilities.

The present disclosure describes example methods and apparatuses in which an electronic device (ED) may be configured and/or enabled to operate in a cooperation mode. Under cooperation mode, there may be two different types of cooperation, namely a relay mode and a joint communication mode. Two or more cooperating EDs may operate together under a relay mode or a joint communication mode. At least one ED operates as a cooperating ED, to assist at least another ED (referred to herein as an assisted ED) in communications over a Uu interface. In the present disclosure, the cooperating ED refers to the ED that helps to transmit or receive, over a Uu interface, at least some data originating from or intended for another ED. The assisted ED is the ED that is assisted by the cooperating ED in this manner. In some instances, the cooperating ED may also be referred to as the cooperating user equipment (CUE), and the assisted ED may also be referred to as the assisted user equipment (UE), source UE (SUE) (e.g., in cases where the assisted ED is the source of data for a uplink transmission) or target UE (TUE) (e.g., in cases where the assisted ED is the target recipient of data for a downlink transmission). The configuration or enabling of the mode of cooperation, and the configuration or enabling of a particular mode of cooperation (e.g., relay mode or joint communication mode) may be specific to a particular assisted ED or particular group of assisted EDs, for example.

The relay mode and the joint communication mode may be modes of ED cooperation that are implemented using cooperative multi-UE multiple-input multiple-output (MU-MIMO) technology. Cooperative MU-MIMO may enable two or more EDs to jointly transmit data originating from one ED.

When two EDs are cooperating using the relay mode, the cooperating ED may operate to relay data (e.g., UL or DL data) between the assisted ED and the network (e.g., as base station (BS)). When two EDs are cooperating using the joint communication mode, the cooperating ED and the assisted ED may jointly transmit data, originating from the assisted ED, over uplink (UL) connections to the network. The joint communication mode may also be used for downlink (DL) communications, in which the cooperating ED and the assisted ED may jointly receive data, intended for the assisted ED, over DL connections. In general, in cooperative UL transmissions the assisted ED may be a data source and the BS may be the intended recipient, and in cooperative DL transmissions the BS may be a data source and the assisted ED may be the intended recipient. In the present disclosure, data may refer to actual data (e.g., content, or data packets). However, it should be understood that the examples described herein may also be implemented for communication of control data.

In examples disclosed herein, the coordination of ED cooperation (e.g., enabling/disabling of cooperation mode and/or selection of the type of cooperation) may be via a control signal from the BS and/or the assisted ED. The control signal may be a lower layer signal (e.g., a physical layer or L1 signal) and/or a higher layer signal (e.g., a logical link control (LLC) signal). In the joint communication mode, data splitting may be used to split the data transmission between the cooperating ED and the assisted ED (with or without duplication of data).

In various examples, the present disclosure may enable an ED to, when cooperation mode is enabled, switch between operation in relay mode and joint communication mode. In some examples, an ED may operate in relay mode when cooperating with a first other ED and operate in joint communication mode when cooperating with a second other ED. The examples disclosed herein may help to enable cooperation among EDs, which may help to improve system performance, in terms of coverage and throughput.

To assist in understanding the present disclosure, an example wireless communication system is described below.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology. In some examples, the wireless system 100 may also accommodate some legacy wireless technology (e.g., 3G or 4G wireless technology).

In the example shown, the wireless system 100 includes EDs 110, radio access networks (RANs) 120, a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment (UE), a wireless transmit/receive unit (WTRU), a mobile station, a mobile relay, a fixed or mobile subscriber unit, a cellular telephone, a station (STA), a machine type communication (MTC) device, a personal digital assistant (PDA), a smartphone, a laptop, a computer, a tablet, a wireless sensor, an internet of things (IoT) device, or a consumer electronics device, among other possibilities. Future generation EDs 110 may be referred to using other terms.

In FIG. 1, the RANs 120 include BSs 170. Although FIG. 1 shows each RAN 120 including a single respective BS 170, it should be understood that any given RAN 120 may include more than one BS 170, and any given RAN 120 may also include base station controller(s) (BSC), radio network controller(s) (RNC), relay nodes, elements, and/or devices. Each BS 170 is configured to wirelessly interface with one or more of the EDs 110 to enable access to any other BS 170, the core network 130, the PSTN 140, the internet 150, and/or the other networks 160. For example, the BSs 170 may also be referred to as (or include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. In some examples, a BS 170 may access the core network 130 via the internet 150.

The EDs 110 and BSs 170 are examples of communication equipment that can be used to implement some or all of the functionality and/or embodiments described herein. Any BS 170 may be a single element, as shown, or multiple elements, distributed in the corresponding RAN 120, or otherwise. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more Uu wireless interfaces 190 (e.g., via radio frequency (RF), microwave, infrared (IR), etc.). The Uu interface 190 may also be referred to as a Uu link, Uu connection, ED-BS link/connection/interface, or ED-network link/connection/interface, for example. The EDs 110 may also communicate directly with one another (i.e., without involving the BS 170) via one or more sidelink (SL) wireless interfaces 195. The SL interface may also be referred to as a SL connection, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology. The core network 130 may also serve as a gateway access between (i) the RANs 120 or EDs 110 or both, and (ii) other networks (such as the PSTN 140, the Internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the Internet 150. PSTN 140 may include circuit switched telephone networks for providing plain old telephone service (POTS). The Internet 150 may include a network of computers and subnets (intranets) or both, and incorporate protocols, such as Internet Protocol (IP), Transmission Control Protocol (TCP), User Datagram Protocol (UDP). The EDs 110 may be multimode devices capable of operation according to multiple radio access technologies, and incorporate multiple transceivers necessary to support such.

Figure 2:
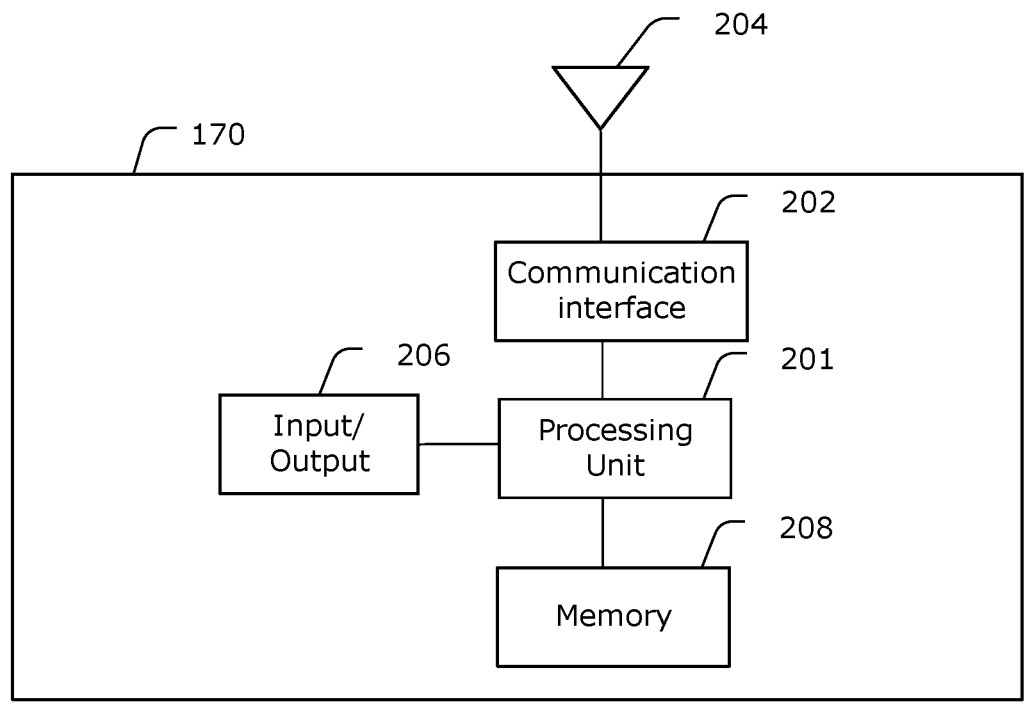
FIGS. 2 and 3 are block diagrams showing an example base station (BS) and an example electronic device (ED), respectively, suitable for implementing examples described herein.
Figure 3:
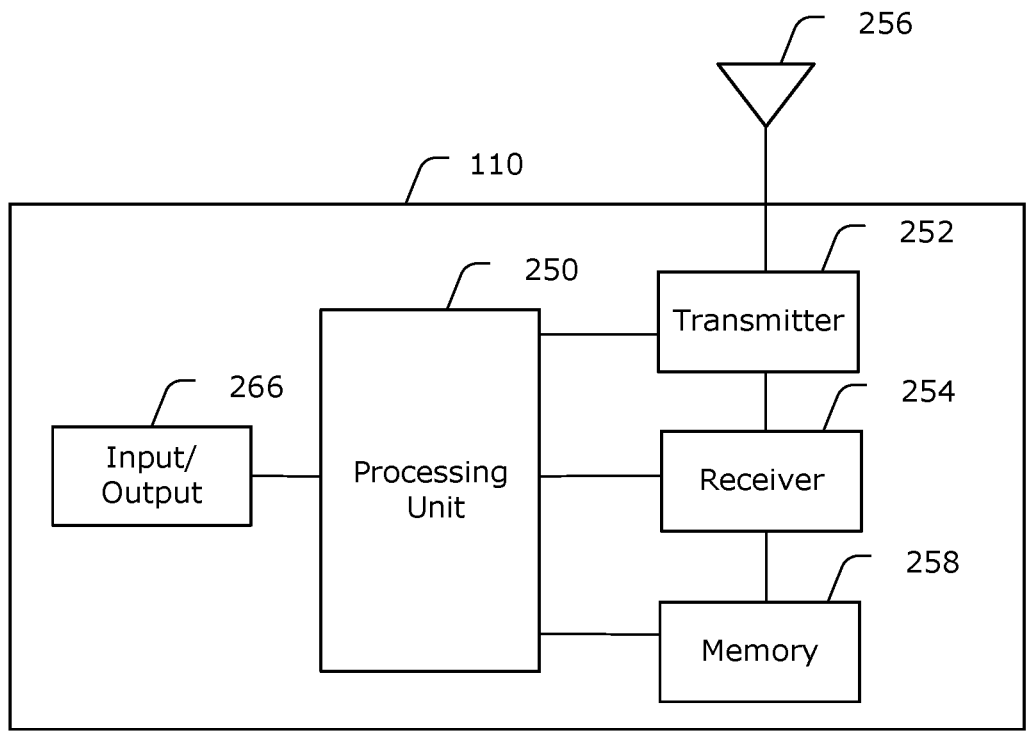

FIGS. 2 and 3 illustrate example devices that may implement the methods and teachings according to this disclosure. FIG. 2 illustrates an example BS 170, and FIG. 3 illustrates an example ED 110. These components could be used in the wireless system 100 or in any other suitable system.

As shown in FIG. 2, the BS 170 includes at least one processing unit 201. The processing unit 201 implements various processing operations of the BS 170. For example, the processing unit 201 could perform signal coding, data processing, power control, input/output processing, or any other functionality of the BS 170. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The BS 170 also includes at least one communication interface 202 for wired and/or wireless communications. Each communication interface 202 includes any suitable structure for generating signals for wireless or wired transmission and/or processing signals received wirelessly or by wire. The BS 170 in this example includes at least one antenna 204 (in other examples, the antenna 204 may be omitted). Each antenna 204 includes any suitable structure for transmitting and/or receiving wireless or wired signals. One or multiple communication interfaces 202 could be used in the BS 170. One or multiple antennas 204 could be used in the BS 170. In some examples, one or more antennas 204 may be an antenna array 204, which may be used to perform beamforming and beam steering operations. Although shown as a single functional unit, a BS 170 could also be implemented using at least one transmitter interface and at least one separate receiver interface.

The BS 170 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the BS 170 includes at least one memory 208. The memory 208 stores instructions and data used, generated, or collected by the BS 170. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the ED 110 includes at least one processing unit 250, at least one transmitter 252, at least one receiver 254, one or more antennas 256, at least one memory 258, and one or more input/output devices or interfaces 266. The processing unit 250 implements various processing operations of the ED 110, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the ED 110. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

An ED 110 may support operation in cooperation mode (e.g., capable of implementing cooperative MU-MIMO technology), in which two or more EDs cooperate with each other, using communications over the SL interface 195, to help improve communications with the BS 170. When operating in cooperation mode, two EDs 110 may be cooperating using a relay mode or a joint communication mode. In some instances, cooperative MU-MIMO technology may be used in joint communication mode, but may not be required or used in relay mode.

Figure 4:
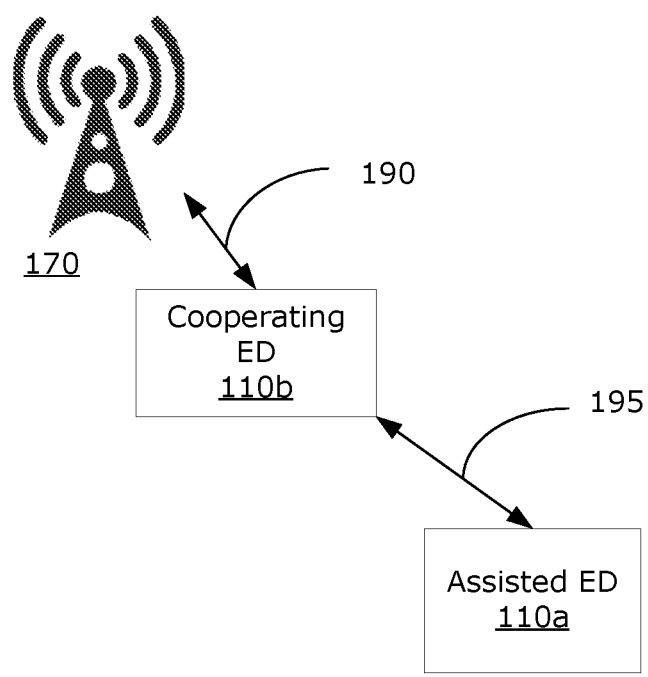
FIG. 4 is a schematic diagram illustrating example cooperation of EDs in a relay mode.

FIG. 4 illustrates example operation of EDs cooperating in a relay mode. In this example, the cooperating ED 110b serves to relay data (e.g., UL and/or DL data) between the BS 170 and the assisted ED 110a. The cooperating ED 110b and the assisted ED 110a may be generally referred to as EDs 110. This mode of cooperation may be similar to operation of conventional relays, which may be used to help improve system coverage to the assisted ED 110 that would otherwise have poor coverage (e.g., is located at cell edge or indoors). For UL communications, the assisted ED 110a communicates data to the cooperating ED 110b over the SL interface 195, and the cooperating ED 110b relays this data to the BS 170 (or other network node) over the Uu interface 190. The data that is shared by the assisted ED 110a may include explicit information (e.g., an identifier label, or header information) or implicit information (e.g., the device identifier of the assisted ED 110a may be applied as a mask to error check bits) identifying the assisted ED 110a as the originating source of this data. For DL communications, the cooperating ED 110b may receive data, which is intended for the assisted ED 110a, from the BS 170 (or other network node) and relay this data to the assisted ED 110a. The data that is to be relayed may include explicit information (e.g., a relay flag, or identifier of the intended recipient) or implicit information (e.g., the device identifier of the intended recipient may be used to mask the encode error check bits) to indicate to the cooperating ED 110b that this data should be relayed, and to indicate the intended recipient of this data. The cooperating ED 110a may also serve as a relay between the assisted ED 110a and a third ED (not shown).

Figure 5A:
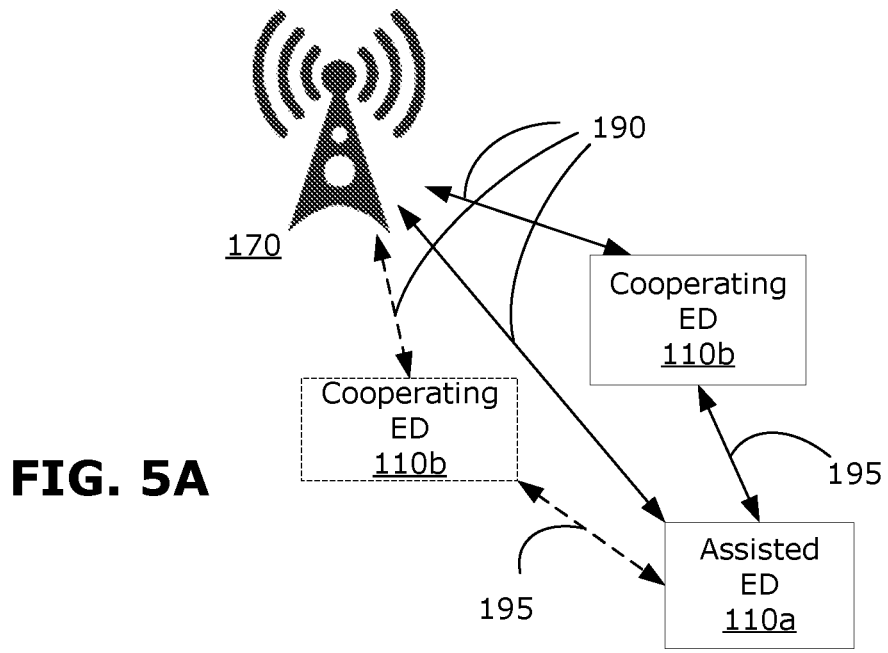
FIGS. 5A and 5B are schematic diagrams illustrating different example cooperation of EDs in joint communication modes.
Figure 5B:
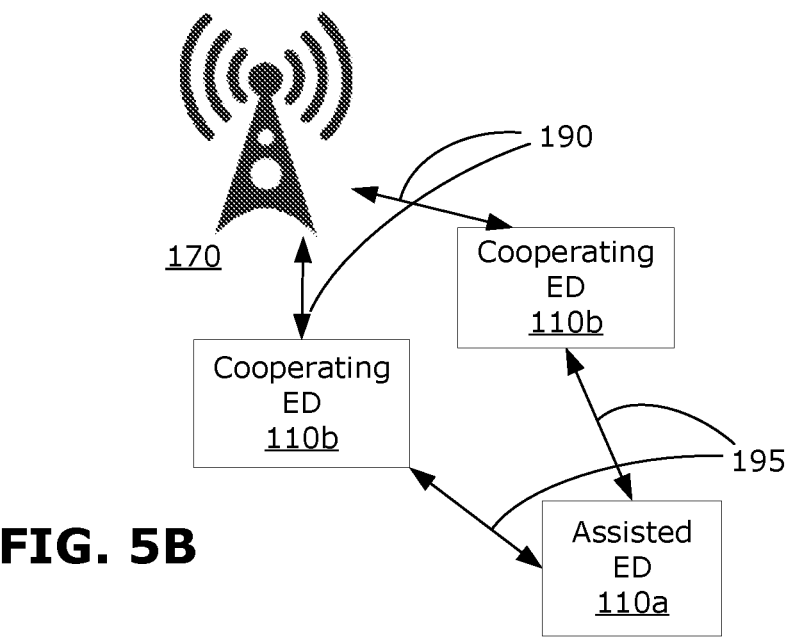

FIGS. 5A and 5B illustrate example operations of EDs cooperating in joint communication modes. Under joint communication mode, the assisted ED 110a may directly communicate with the BS 170 over the Uu interface 190 (e.g., as shown in FIG. 5A), or the assisted ED 110a may not be involved in directed communication with the BS 170 (e.g., as shown in FIG. 5B). Joint communication mode may help to improve system throughput on the Uu interface 190, by enabling two or more EDs to jointly communicate data that is originating from or intended for the assisted ED 110a.

Cooperative MU-MIMO technology may be used to enable data to be jointly transmitted. In some examples, a block of data may be split into two or more portions and different portions may be transmitted by different EDs 110 in a joint communication. The jointly transmitted portions of data may need to be reassembled at the recipient (e.g., at the BS 170). Information for properly reassembling these portions of data may be explicitly or implicitly for the joint communication, as discussed further below.

FIG. 5A is now described in further detail. For simplicity, FIG. 5A will be described with reference to UL communication of data. However, it should be understood that similar operations (in the reverse direction) may be performed for DL communication of data. For implementation of the joint communication mode for DL communication, the assisted ED 110a may be notified (e.g., via an indicator contained in a DCI message, as discussed further below) ahead of the joint communication so that the assisted ED 110a may be appropriately prepared to receive data over both the Uu interface 190 and the SL interface 195. For UL communication using joint communication mode, data originates from the assisted ED 110a. The assisted ED 110a shares some or all of the data with one or more cooperating EDs 110b over the SL interface 195. The cooperating ED(s) 110b and the assisted ED 110a together jointly transmit the data (which originated from the assisted ED 110a) to the BS 170 (or other network node), or another ED (not shown). The data transmitted by the cooperating ED(s) 110b may be the same as, partly different from, or entirely different from the data transmitted by the assisted ED 110a. If there are two or more cooperating EDs 110b involved in this joint communication, each cooperating ED 110b may transmit the same, partly different, or entirely different data from each other. Joint communication of the same data by multiple EDs 110 (e.g., block of data is duplicated over the EDs 110a) may help to improve or maintain system performance (e.g., enabling higher data fidelity and/or better error correction), for example at the cell edge. Joint communication of different data by multiple EDs 110s (e.g., block of data is split among the EDs 110s) may help to improve system throughput, for example by enabling a large block of data to be split among multiple different transmission streams by multiple EDs 110 (or, in the case of DL communications, by enabling a large block of data to be split among multiple different receiving datastreams of multiple EDs 110). For both UL and DL communications using joint communication mode, optionally the cooperating ED 110b may be sent an indicator to enable joint communication mode. In some examples, it may not be necessary to notify the cooperating ED 110b to use joint communication mode, because the cooperating ED 110b simply forwards whatever data is received without knowledge of whether joint communication mode or relay mode is being used. In other words, the cooperating ED 110b may act as a relay regardless of whether relay mode or joint communication mode is being used.

FIG. 5B is now described in further detail. For simplicity, FIG. 5B will be described with reference to UL communication of data. However, it should be understood that similar operations (in the reverse direction) may be performed for DL communication of data. For UL communication using joint communication mode, data originates from the assisted ED 110a. Similarly to the operation described with respect to FIG. 5A, the assisted ED 110a shares some or all of the data with cooperating EDs 110b over the SL interface 195. Unlike the example of FIG. 5A, in the example of FIG. 5B, the assisted ED 110a is not itself involved in the joint communication over the Uu interface 190 (e.g., due to the assisted ED 110a being outside of the coverage area, or having poor channel quality). The two or more cooperating EDs 110b together jointly transmit the data (which originated from the assisted ED 110a) to the BS 170 (or other network node), or another ED (not shown). Each cooperating ED 110b may transmit the same, partly different, or entirely different data from each other. Joint communication of different data by multiple EDs 110s may help to improve system throughput, for example by enabling a large block of data to be split among multiple different transmission streams by multiple EDs 110 (or, in the case of DL communications, by enabling a large block of data to be split among multiple different receiving data streams of multiple EDs 110).

These two modes of cooperation, namely relay mode and joint communication mode, could be used selectively and at the same or different times to achieve certain goals. The assisted ED 110a may be helped by the relay mode or the joint communication mode, in different scenarios. For example, if the assisted ED 110a is in a coverage hole and may not have large amount of data to transmit/receive on the Uu interface 190, the assisted ED 110a may cooperate with the cooperating ED 110b in the relay mode (e.g., as shown in FIG. 4). In another situation, if the assisted ED 110a has large amount of data to transmit/receive on the Uu interface 190, the assisted ED 110a and one or more cooperating EDs 110b may jointly transmit/receive the data in the joint communication mode (e.g., as shown in FIG. 5A or FIG. 5B).

Therefore, it may be useful for the ED 110 to support both the relay mode and the joint communication mode of cooperation, and to select operation in a certain mode of cooperation. The selection of a particular mode of cooperation may be simultaneous with or subsequent to enabling of the cooperation mode. For example, the ED 110 may, when cooperation mode is enabled, operate in the relay mode by default until the joint communication mode is explicitly selected. In another example, the ED 110 may have cooperation mode enabled by default (or may always be enabled) and the ED 110 simply switches between relay mode and joint communication mode. The present disclosure describes examples of how configuration/indication may be signaled. The present disclosure also describes examples of how data splitting may be implemented, in the joint communication mode.

In some examples, it may not be necessary for the cooperating ED 110b to select between relay mode and joint communication mode. For example, regardless of whether the cooperation is relay mode or joint communication mode, the cooperating ED 110b may simply operate decode and forward functions, and the cooperating ED 110b may not need to know whether the data being forwarded is part of a joint communication. Thus, joint communication mode may be transparent to the cooperating ED 110b, and the cooperating ED 110b may only need to be configured for relay mode. In this way, only the assisted ED 110a may need to select between relay mode and joint communication mode. Further, the assisted ED 110a may use either cooperation mode with any cooperating ED 110b that is capable of operating as a relay, such that EDs (e.g., legacy EDs) that are not explicitly configured for or not explicitly supporting joint communication mode may still act in the role of the cooperating ED 110b. In general, an ED may participate in the examples described herein to the extent that it can be configured to the different modes of cooperation (e.g., whether the ED supports the relay mode of cooperation, the joint communication mode of cooperation, or both).

Figure 6B:
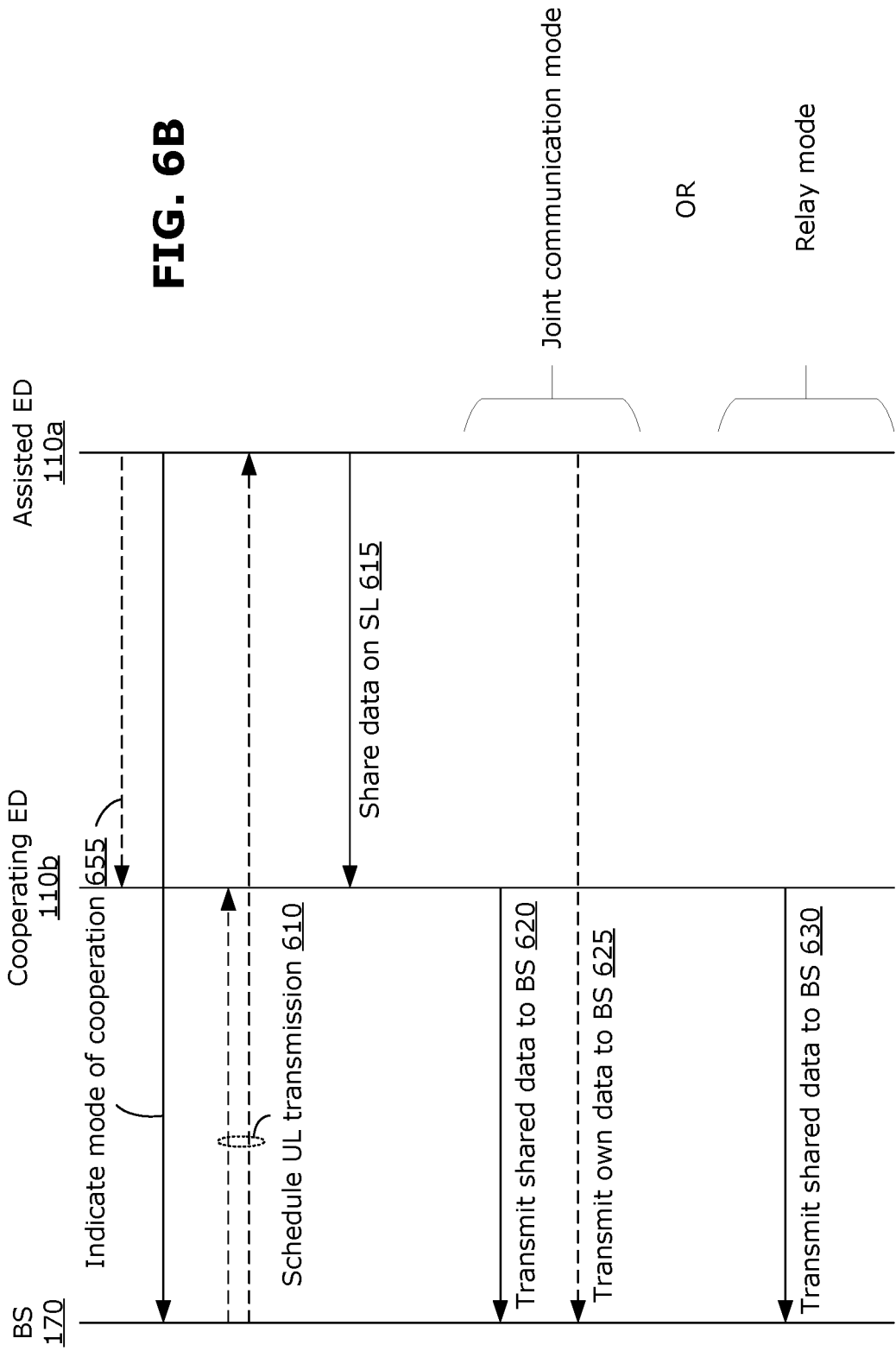
Figure 6D:
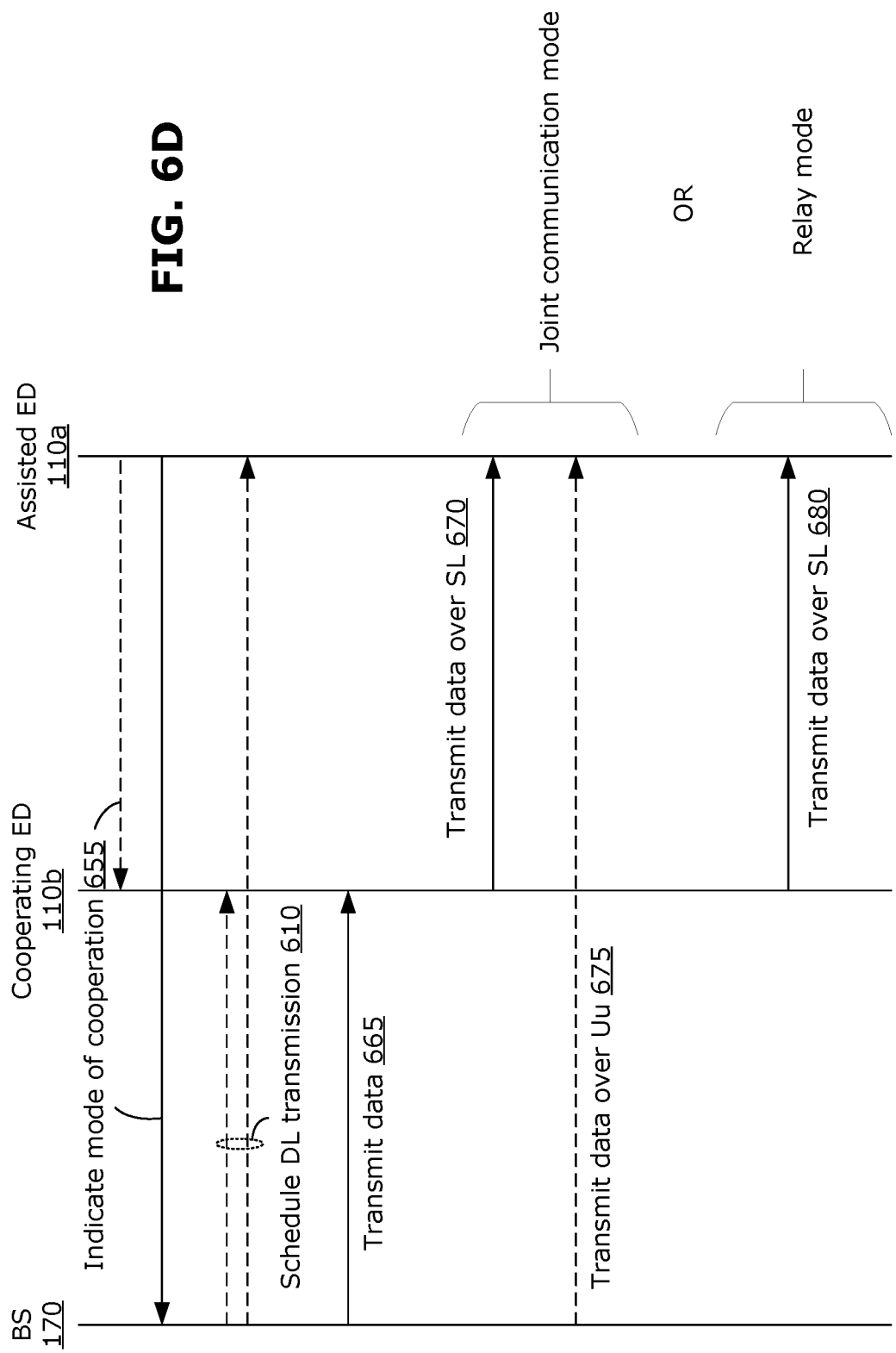

FIGS. 6A-6D are signaling diagrams illustrating example data flows for coordination of the modes of cooperation. In these figures, the BS 170, assisted ED 110a and cooperating ED 110b are shown in the singular for simplicity. It should be understood that this is not intended to be limiting. For example, as discussed above, there may be more than one cooperating ED 110b cooperating with one assisted ED 110a. Further, as will be discussed below, there may be more than one assisted ED 110a cooperating with one cooperating ED 110b. FIGS. 6A and 6B show data flows for implementing ED cooperation in UL transmissions. FIGS. 6C and 6D show data flows for implementing ED cooperation in DL transmissions. One skilled in the art would understand that modifications may be made to adapt these data flows for different scenarios.

FIG. 6A is described first. FIG. 6A illustrates a set of data flows in which a mode of cooperation is initiated by the BS 170. The BS 170 transmits a signal 605 (e.g., control signal, such as a radio resource control (RRC) signal and/or a downlink control information (DCI) message) to the assisted ED 110a, and optionally to the cooperating ED 110b, to indicate the mode of cooperation (e.g., relay mode or joint communication mode) to be used. If the joint communication mode is indicated, the signal 605 may further indicate whether data duplication or data splitting should be used. The BS 170 may, for example, determine which mode of cooperation to be used based on detected channel conditions (e.g., measured channel quality between the BS 170 and the assisted ED 110a and/or feedback information received from the EDs 110), detected mobility of the assisted ED 110a, or other factors. The BS 170 may further indicate which ED should be used as the cooperating ED 110b (e.g., based on which ED has better channel conditions) and may include indication of one or more preferred cooperating EDs 110b in the signal 605. If the BS 170 does not identify any preferred cooperating ED 110b (or if the assisted ED 110a is unable to establish a SL interface with the identified preferred cooperating ED 110b, for example), the assisted ED 110a may identify and select the cooperating ED 110b, for example using suitable discovery procedures.

In some examples, the BS 170 may not transmit the signal 605 directly to the assisted ED 110a (e.g., the assisted ED 110a may be outside of coverage). The BS 170 may instead transmit the signal 605 to the cooperating ED 110b, with an indicator that the signal 605 should be relayed (via the cooperating ED 110b) to the assisted ED 110a. This may be the case for a relay mode of cooperation, for example.

Optionally, the BS 170 may transmit a scheduling signal 610 to schedule resources for UL transmission by the assisted ED 110a and the cooperating ED 110b. In examples in which the scheduling signal 610 is not sent, the assisted ED 110a and the cooperating ED 110b may use a pre-configured grant (e.g., pre-configured scheduling information) to enable cooperation mode, including both the relay and joint communication modes.

Receipt of the signal 605 by the assisted ED 110a causes the assisted ED 110a to perform operations in accordance with the indicated mode of cooperation. If the joint communication mode is indicated by the signal 605, the assisted ED 110a may perform data duplication or data splitting, and share the duplicated or a portion of the split data with the cooperating ED 110b over a SL (615). If the relay mode is indicated by the signal 605, the assisted ED 110a may share the data over the SL (615) without performing data duplication or data splitting. In some examples, the transmission 615 over the SL interface may provide information to the cooperating ED 110b about the indicated mode of cooperation (e.g., if the BS 170 did not transmit the signal 605 to the cooperating ED 110b). In some examples, the cooperating ED 110b may not require the signal 605 from the BS 170 and also may not require indication of the mode of cooperation from the assisted ED 110a. For example, the cooperating ED 110b may use a relay mode of cooperation by default. The cooperating ED 110b may not need to know the mode of cooperation, for example the cooperating ED 110b may simply relay data without requiring knowledge whether the relay mode or the joint communication mode is being used.

In joint communication mode, the shared data (either duplicated data or a portion of the split data) is transmitted UL, over the Uu interface, from the cooperating ED 110b to the BS 170 (620). A joint UL transmission of data (625) (either the duplicated data or another portion of the split data) is performed by the assisted ED 110a and/or optionally by another cooperating ED 110b (not shown). The BS 170 receives the jointly transmitted data and processes the data accordingly. For example, if data splitting was performed, the BS 170 may identify the portions of data (e.g., using information contained in headers associated with the data) and reassemble the portions in order to recover the complete data.

In relay mode, the shared data is entirely transmitted UL from the cooperating ED 110b to the BS 170 (630). The BS 170 may identify the received data as originated from the assisted ED 110a (e.g., based on having instructed the assisted ED 110a to use the relay mode, or based on information provided with the data such as in a header).

It should be noted that the indication of the mode of cooperation (605) may need to be transmitted only to enable and/or switch the mode of cooperation. For example, sharing data over the SL interface (615) and joint communication of data (620 and 625) may be performed repeatedly while remaining in the joint communication mode of cooperation, without requiring any further control signal 605 from the BS 170. The signal 605 may be transmitted again only when the mode of cooperation is to be changed (e.g., from joint communication mode to relay mode, or vice versa).

FIG. 6B is now described. FIG. 6B illustrates a set of data flows in which a mode of cooperation is initiated by the assisted ED 110a. FIG. 6B is similar to FIG. 6A, with the difference that instead of the BS 170 transmitting the signal 605, the assisted ED 110a instead transmits a signal 655 to indicate the mode of cooperation to the BS 170 and optionally to the cooperating ED 110b. The signal 655 to the cooperating ED 110b may be, for example, a sidelink control information (SCI) message and/or a sidelink physical layer (PC5) RRC signal, and/or in the form of a packet over the SL interface. The signal 655 to the BS 170 may be, for example, over a direct link to the BS 170 such as in a Uu RRC, a media access control (MAC) control element (CE), over the physical uplink control channel (PUCCH), or over the physical uplink shared channel (PUSCH). In some examples, if the assisted ED 110a does not transmit the signal 655 to the cooperating ED 110b, the BS 170 may instead provide information indicating the mode of cooperation to the cooperating ED 110b. In some examples, the cooperating ED 110b may not require the signal 655 from the assisted ED 110a and also may not require indication of the mode of cooperation from the BS 170. For example, the cooperating ED 110b may use a relay mode of cooperation by default. The cooperating ED 110b may not need to know the mode of cooperation, for example the cooperating ED 110b may simply relay data without requiring knowledge whether the relay mode or the joint communication mode is being used. If the joint communication mode is indicated, the signal 655 may further indicate whether data duplication or data splitting will be used. The assisted ED 110a may, for example, determine which mode of cooperation to be used based on detected channel conditions between itself and the intended recipient (e.g., the BS 170), its own detected mobility, or other factors. Having determined the mode of cooperation and indicated the mode of cooperation to the BS 170 (and optionally to the cooperating ED 110b), the assisted ED 110a may perform operations in accordance with the indicated mode of cooperation, as discussed above.

In some examples, the signal 655 may be transmitted to the BS 170 in order to trigger the BS 170 to properly schedule UL transmission resources, for example. In the case of joint communication mode, the signal 655 may carry information to enable the BS 170 to properly decode and reassemble the jointly transmitted data.

In some examples, the signal 655 may not be transmitted to the BS 170. For example, in the case of the relay mode of cooperation, the assisted ED 110a may not have a direct connection with the BS 170 (e.g., the assisted ED 110a is outside of system coverage). In such a case, the signal 655 may be transmitted only to the cooperating ED 110b, or the signal 655 may not be transmitted at all.

Other signals shown in FIG. 6B are similar to those discussed with respect to FIG. 6A, and will not be repeated here. Similar to the example of FIG. 6A, in the example of FIG. 6B the scheduling signal 610 may be optional. If the scheduling signal 610 is not sent, the assisted ED 110a and the cooperating ED 110b may use a pre-configured grant (e.g., pre-configured scheduling information) to enable cooperation mode, including both the relay and joint communication modes. Similar to the data flow of FIG. 6A, the signal 655 may only need to be transmitted to enable and/or switch the mode of cooperation.

FIG. 6C is now described. FIG. 6C illustrates a set of data flows in which a mode of cooperation, for DL communication, is initiated by the BS 170. The signals 605 and 610 are similar to those described with reference to FIG. 6A, and will not be described again here except to note the difference that in the example of FIG. 6C the optional signal 610 is for scheduling DL transmission. Similar to the examples of FIGS. 6A and 6B, in the example of FIG. 6C the scheduling signal 610 may be optional. If the scheduling signal 610 is not sent, the assisted ED 110a and the cooperating ED 110b may use a pre-configured grant (e.g., pre-configured scheduling information) to enable cooperation mode, including both the relay and joint communication modes.

Receipt of the signal 605 by the assisted ED 110a (and optionally receipt of the signal 605 by the cooperating ED 110b) causes the assisted ED 110a (and optionally the cooperating ED 110b) to perform operations in accordance with the indicated mode of cooperation. If the joint communication mode is indicated by the signal 605, the assisted ED 110a may prepare itself to receive data over both the Uu interface and the SL interface. If the relay mode is indicated by the signal 605, the assisted ED 110a may only need to be prepared to receive data over the SL interface. The BS 170 transmits data (665) to the cooperating ED 110b over the Uu interface. In the relay mode of cooperation, the transmission 665 may be the entirety of the data to be relayed to the assisted ED 110a. In the joint communication mode of cooperation, the transmission 665 may be duplicated data or a portion of split data. In some examples, the transmission 665 over the Uu interface may provide information to the cooperating ED 110b about the indicated mode of cooperation (e.g., if the BS 170 did not transmit the signal 605 to the cooperating ED 110b).

In joint communication mode, the shared data (either duplicated data or a portion of the split data) is transmitted, over the SL interface, from the cooperating ED 110b (and optionally by another cooperating ED 110b (not shown)) to the assisted ED 110a (670). A joint transmission of data (675) (either the duplicated data or another portion of the split data) may be performed by the BS 170 over the Uu interface. The assisted ED 110a receives the jointly transmitted data and processes the data accordingly. For example, if data splitting was performed, the assisted ED 110a may identify the portions of data (e.g., using information contained in headers associated with the data) and reassemble the portions in order to recover the complete data.

In relay mode, the shared data is entirely transmitted over the SL interface from the cooperating ED 110b to the assisted ED 110a (680). The assisted ED 110a may identify the received data as originating from the BS 170 (e.g., based on having instructed the assisted ED 110a to use the relay mode, or based on information provided with the data such as in a header).

FIG. 6D is now described. FIG. 6D illustrates a set of data flows in which a mode of cooperation, for DL communication of data, is initiated by the assisted ED 110a. The signals 655, 610, 665, 670, 675 and 680 are similar to those described above with respect to FIGS. 6A-6C (noting that the optional scheduling signal is for scheduling of DL transmission), and the details will not be repeated in detail here. One skilled in the art would understand the example illustrated in FIG. 6D based on the descriptions above and the data flows as shown in FIG. 6D. Similar to the examples of FIGS. 6-6C, in the example of FIG. 6D the scheduling signal 610 may be optional. If the scheduling signal 610 is not sent, the assisted ED 110a and the cooperating ED 110b may use a pre-configured grant (e.g., pre-configured scheduling information) to enable cooperation mode, including both the relay and joint communication modes.

Figure 7:
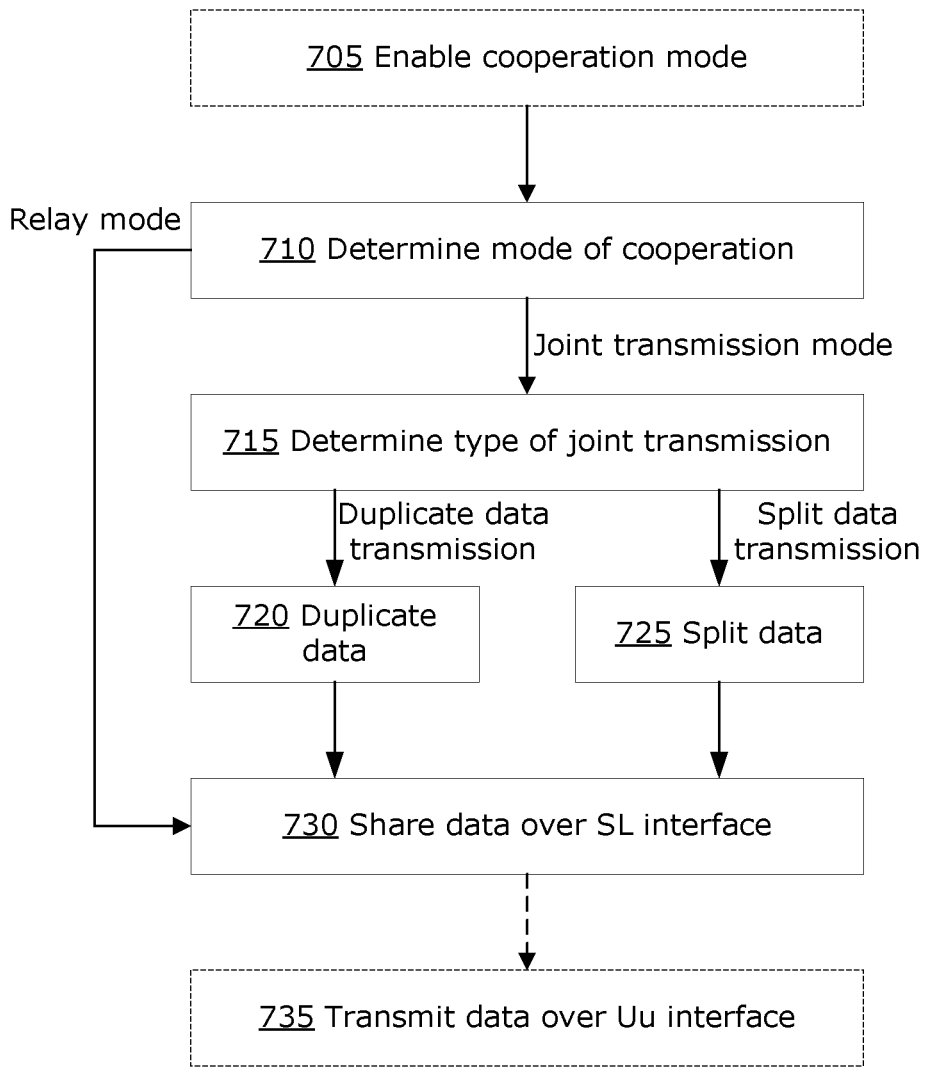
FIG. 7 is a flowchart illustrating an example operation of an assisted ED for UL communications.

FIG. 7 is a flowchart illustrating an example operation of the assisted ED 110a, using ED cooperation for UL communications. The method illustrated in FIG. 7 may be performed by the ED 110a, using instructions stored in a memory and executed by a processing unit (see FIG. 3, for example).

Optionally, at 705, cooperation mode may first be enabled at the assisted ED 110a (e.g., in response to a control signal from the BS 170, or in response to the ED 110a itself determining a need for ED cooperation). Cooperation mode may need to be enabled in order for ED cooperation to take place. In some examples, ED cooperation may always be enabled or may be enabled by default, and it may not be necessary to enable cooperation mode, in which case 705 may be omitted.

At 710, the assisted ED 110a determines the mode of cooperation (e.g., relay mode or joint communication mode). This determination may be based on a control signal received from the BS 170 (e.g., the signal 605 in the data flow of FIG. 6A) or may be determined by the ED 110a itself (e.g., in the data flow of FIG. 6B). If the assisted ED 110a itself determines the mode of cooperation, optionally the assisted ED 110a may transmit an indicator of the determined mode of cooperation to the BS 170 and/or to the cooperating ED 110b.

If the relay mode is determined, the method proceeds to 730, described further below. If the joint communication mode is determined, the method proceeds to 715.

At 715, the type of joint communication is determined. Again, this determination may be based on a control signal received from the BS 170 (e.g., the signal 605 in the data flow of FIG. 6A) or may be determined by the ED 110a itself (e.g., in the data flow of FIG. 6B).

If data duplication is determined, then at 720 the data is duplicated.

If data splitting is determined, then at 725 the data is split. Data splitting may be performed in various ways, as discussed further below.

At 730, data is shared with the cooperating ED 110b over a SL interface. The shared data may be the entire data (in the case of relay mode), the duplicated data (in the case of joint communication mode with data duplication) or a portion of the split data (in the case of joint communication mode with data splitting). The assisted ED 110a may or may not provide information (in the same or separate transmission over the SL interface) to the cooperating ED 110b about whether the shared data is for a joint communication (and, in the case of a joint communication the assisted ED 110a may or may not inform the cooperating ED 110b whether the shared data is duplicated data or a portion of split data). It may be sufficient for the shared data to be indicated as data that is to be relayed to the BS 170, such that the joint communication mode is transparent to the cooperating ED 110b.

Optionally, if using joint communication mode and the assisted ED 110a is itself performing a joint communication, at 735 the assisted ED 110a transmits data over the Uu interface. The data transmitted by the assisted ED 110a may be the duplicated data (in the case of joint communication mode with data duplication) or a portion of the split data (in the case of joint communication mode with data splitting).

Figure 8:
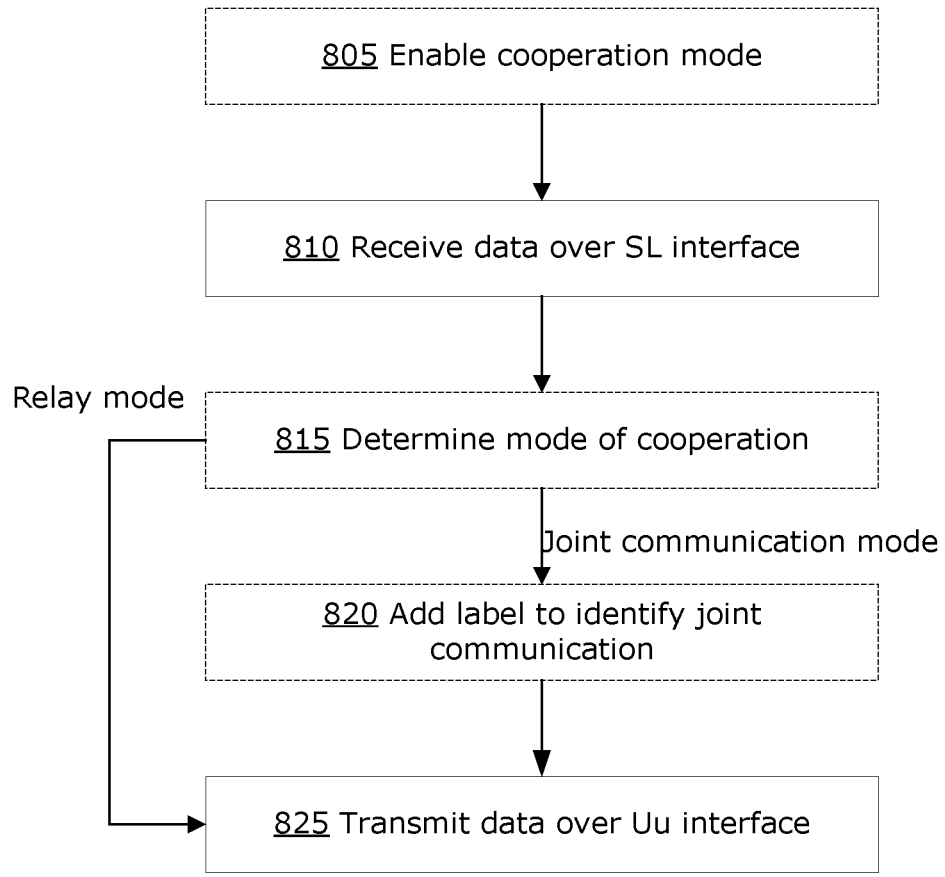
FIG. 8 is a flowchart illustrating an example operation of a cooperating ED for UL communications.

FIG. 8 is a flowchart illustrating an example operation of the cooperating ED 110b, using ED cooperation for UL communications. The method illustrated in FIG. 8 may be performed by the ED 110b, using instructions stored in a memory and executed by a processing unit (see FIG. 3, for example). The method illustrated in FIG. 8 may be performed by the cooperating ED 110b in cooperation with the assisted ED 110a performing the method of FIG. 7.

Optionally, at 805, cooperation mode may first be enabled at the cooperating ED 110b (e.g., in response to a signal from the BS 170, or from the assisted ED 110a). Cooperation mode may need to be enabled in order for ED cooperation to take place. In some examples, ED cooperation may always be enabled or may be enabled by default, and it may not be necessary to enable cooperation mode, in which case 805 may be omitted.

At 810, the cooperating ED 110b receives data, from the assisted ED 110a, over the SL interface. The received data may be duplicated data or a portion of split data, in the case of joint communication mode. The cooperating ED 110b may or may not be informed about whether the received data is duplicated data or a portion of split data, or whether the data is part of a joint communication. It may be sufficient for the cooperating ED 110b to have an indication that the received data should be forwarded to the BS 170.

Optionally, at 815, the cooperating ED 110b determines the mode of cooperation (e.g., relay mode or joint communication mode). This determination may be based on a control signal received from the BS 170 (e.g., the signal 605 in the data flow of FIG. 6A) or may be determined based on a signal received from the assisted ED 110a (e.g., the signal 655 in the data flow of FIG. 6B). In some cases, the cooperating ED 110b may receive such a signal (and may thus determine the mode of cooperation) prior to receiving data over the SL interface, such that the order of 810 and 815 may be switched. If the relay mode is determined, the method proceeds to 825. If the joint communication mode is determined, the method proceeds to optional 820. In some examples, the cooperating ED 110b may not be informed about whether the mode of cooperation is relay mode or joint communication mode. As discussed previously, the mode of cooperation may be transparent to the cooperating ED 110b, and the ED 110b may simply forward the shared data regardless of the mode of cooperation, or the cooperating ED 110b may use a relay mode by default. Accordingly, 815 may be omitted.

If 815 is performed and the joint communication mode is determined, then optionally 820 may be performed to label the data that is to be forwarded as part of a joint communication (and, if the data has been split, which portion of the split data is being forwarded by the cooperating ED 110b). Such labeling of the forwarded data may help the BS 170 to reassemble the data from the multiple joint communications. The ability of the cooperating ED 110b to label the data in this manner may require the cooperating ED 110b to be provided with information about the type of data in the joint communication (e.g., duplicated data or split data). Such information may be provided to the cooperating ED 110b by a control signal received from the BS 170 (e.g., the signal 605 in the data flow of FIG. 6A) or a signal received from the assisted ED 110a (e.g., the signal 655 in the data flow of FIG. 6B).

At 825, the shared data is transmitted by the cooperating ED 110b over the Uu interface.

As previously discussed, ED cooperation may also be useful to help improve DL communications (to help extend system coverage and/or to help improve system throughput). The implementation of different modes of cooperation, for DL communications, may be similar to that for UL communications discussed above, but in the reverse direction (e.g., with the data originating from the BS 170 and received at the assisted ED 110a).

Figure 9A:
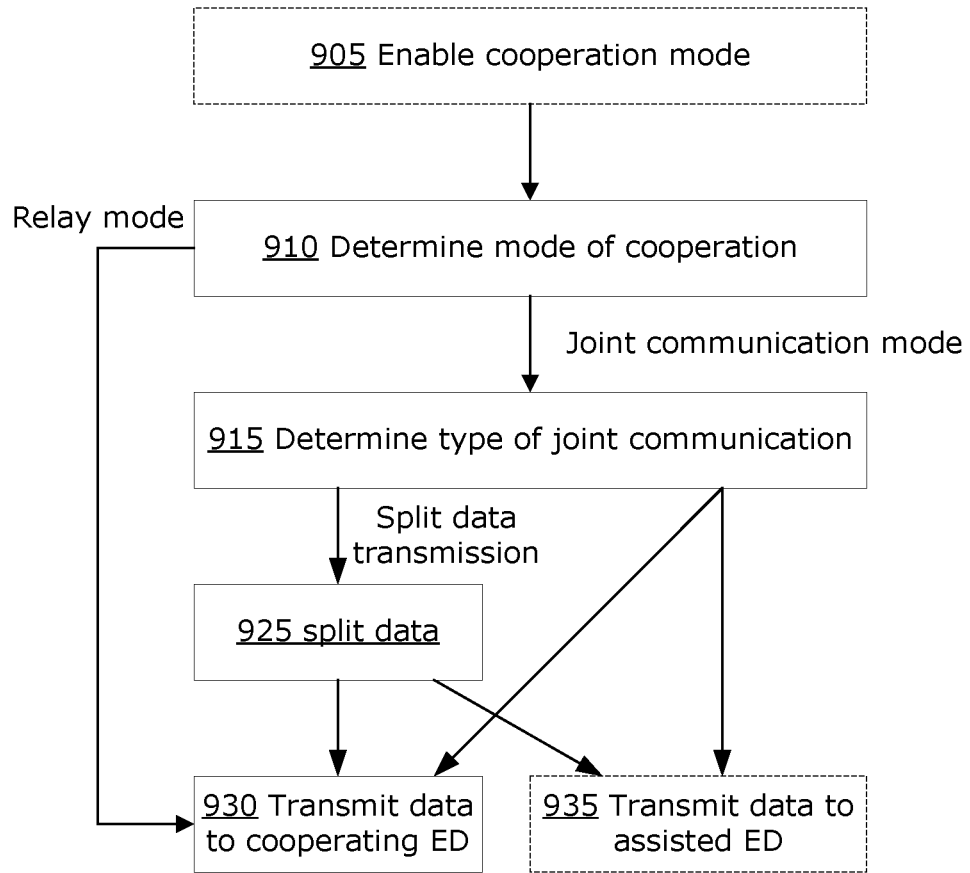
FIG. 9A is a flowchart illustrating an example operation of a BS for DL communications.

FIG. 9A is a flowchart illustrating an example operation of the BS 170 when ED cooperation is used for DL communications. The method illustrated in FIG. 9A may be performed by the BS 170, using instructions stored in a memory and executed by a processing unit (see FIG. 2, for example).

Optionally, at 905, cooperation mode may first be enabled at the assisted ED 110a (e.g., by sending a control signal from the BS 170). Cooperation mode may need to be enabled in order for ED cooperation to take place. In some examples, ED cooperation may always be enabled at the EDs 110 or may be enabled at the EDs 110 by default, and it may not be necessary to enable cooperation mode, in which case 905 may be omitted.

At 910, the BS 170 determines the mode of cooperation (e.g., relay mode or joint communication mode). This determination may be determined by the BS 170 itself (e.g., in the data flow of FIG. 6A) or may be determined based on a signal received from the assisted ED 110a (e.g., the signal 655 in the data flow of FIG. 6B). If the BS 170 itself determines the mode of cooperation, the BS 170 may transmit an indicator of the determined mode of cooperation to the assisted ED 110a and/or optionally to the cooperating ED 110b. In some examples, an indicator may only be transmitted to enable the joint communication mode of cooperation at the EDs 110, and in the absence of an explicit indicator the relay mode of cooperation may be used by default.

If the relay mode is determined, the method proceeds to 930, described further below. If the joint communication mode is determined, the method proceeds to 915.

At 915, the type of joint communication is determined. Again, this determination may be determined by the BS 170 itself (e.g., in the data flow of FIG. 6A) or may be determined based on a signal received from the assisted ED 110a (e.g., the signal 655 in the data flow of FIG. 6B).

If data splitting is determined, then at 925 the data is split. Data splitting may be performed in various ways, as discussed further below.

If no data splitting is determined (or if data duplication is determined), then the entire data may be transmitted. In some examples, the entire data may be duplicated. If there is no data splitting, the same data may be multicast to both the cooperating ED 11b and the assisted ED 110a over the Uu interface.

At 930, data is transmitted over the Uu interface to the cooperating ED 110b. The transmitted data may be the entire data (in the case of relay mode or in the case of joint communication mode without data splitting), the duplicated data (in the case of joint communication mode with data duplication) or a portion of the split data (in the case of joint communication mode with data splitting). The BS 170 may or may not provide information (in the same or separate transmission over the Uu interface) to the cooperating ED 110b about whether the transmitted data is for a joint communication (and, in the case of a joint communication the assisted ED 110a may or may not inform the cooperating ED 110b whether the shared data is duplicated data or a portion of split data). It may be sufficient for the BS 170 to indicate to the cooperating ED 110b that the data is to be relayed to the intended recipient assisted ED 110a.

Optionally, if using joint communication mode and the assisted ED 110a is itself participating as a joint recipient, at 935 data is transmitted to the assisted ED 110a over the Uu interface. Similarly to the transmission at 930, the data optionally transmitted to the assisted ED 110a may be the entire data (in the case of joint communication mode without data splitting), the duplicated data (in the case of joint communication mode with data duplication) or a portion of the split data (in the case of joint communication mode with data splitting).

Figure 9B:
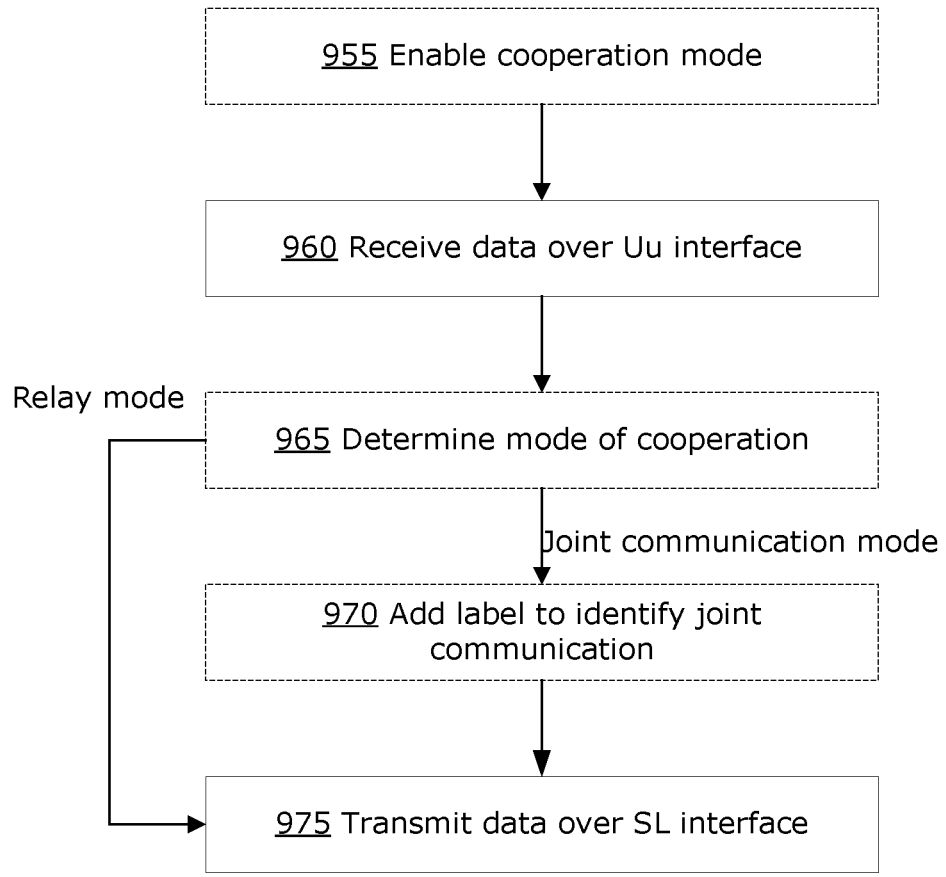
FIG. 9B is a flowchart illustrating an example operation of a cooperating ED for DL communications.

FIG. 9B is a flowchart illustrating an example operation of the cooperating ED 110b, using ED cooperation for DL communications. The method illustrated in FIG. 9B may be performed by the ED 110b, using instructions stored in a memory and executed by a processing unit (see FIG. 3, for example). The method illustrated in FIG. 9B may be performed by the cooperating ED 110b in cooperation with the BS 170 performing the method of FIG. 9A.

Optionally, at 955, cooperation mode may first be enabled at the cooperating ED 110b (e.g., in response to a signal from the BS 170, or from the assisted ED 110a). Cooperation mode may need to be enabled in order for ED cooperation to take place. In some examples, ED cooperation may always be enabled or may be enabled by default, and it may not be necessary to enable cooperation mode, in which case 955 may be omitted.

At 960, the cooperating ED 110b receives data, from the BS 170, over the Uu interface. The received data may be duplicated data or a portion of split data, in the case of joint communication mode. The cooperating ED 110b may or may not be informed about whether the received data is duplicated data or a portion of split data, or whether the data is part of a joint communication. It may be sufficient for the cooperating ED 110*b* to have an indication that the received data should be forwarded to the assisted ED 110*a*.

Optionally, at 965, the cooperating ED 110*b* determines the mode of cooperation (e.g., relay mode or joint communication mode). This determination may be based on a control signal received from the BS 170 (e.g., the signal 605 in the data flow of FIG. 6C) or may be determined based on a signal received from the assisted ED 110*a* (e.g., the signal 655 in the data flow of FIG. 6D). In some cases, the cooperating ED 110*b* may receive such a signal (and may thus determine the mode of cooperation) prior to receiving data over the Uu interface, such that the order of 960 and 965 may be switched. If the relay mode is determined, the method proceeds to 975. If the joint communication mode is determined, the method proceeds to optional 970. In some examples, the cooperating ED 110*b* may not be informed about whether the mode of cooperation is relay mode or joint communication mode. As discussed previously, the mode of cooperation may be transparent to the cooperating ED 110*b*, and the ED 110*b* may simply forward the shared data regardless of the mode of cooperation. Accordingly, 965 may be omitted.

If 965 is performed and the joint communication mode is determined, then optionally 970 may be performed to label the data that is to be forwarded as part of a joint communication (and, if the data has been split, which portion of the split data is being forwarded by the cooperating ED 110*b*). Such labeling of the forwarded data may help the assisted ED 110*a* to reassemble the data from the multiple joint communications. The ability of the cooperating ED 110*b* to label the data in this manner may require the cooperating ED 110*b* to be provided with information about the type of data in the joint communication (e.g., duplicated data or split data). Such information may be provided to the cooperating ED 110*b* by a control signal received from the BS 170 (e.g., the signal 605 in the data flow of FIG. 6C) or a signal received from the assisted ED 110*a* (e.g., the signal 655 in the data flow of FIG. 6D).

At 975, the shared data is transmitted by the cooperating ED 110*b* to the assisted ED 110*a*, over the SL interface. The data transmitted at 975 may be the entire data (in the case of relay mode), the duplicated data (in the case of joint communication mode with data duplication) or a portion of the split data (in the case of joint communication mode with data splitting).

The above examples describe an example mechanism for coordinating ED cooperation, including how the relay mode of cooperation and the joint communication mode of cooperation may be implemented, and how to enable and change between the two modes of cooperation. In particular, both modes of cooperation may be supported by the cooperating ED 110*b* (although the cooperating ED 110*b* may not need to be explicitly aware of the mode of cooperation), which helps to make the role of the cooperating ED 110*b* to be more flexible and adaptable for different needs (e.g., depending on needs for system coverage enhancement or improved system throughput).

In some examples, enabling and/or switching the mode of cooperation may be via signaling by the BS 170. For example, the BS 170 may send a control signal by RRC signaling, by DCI message (e.g., to enable a mode of cooperation for a particular transmission), or a combination of the two. An example of a combined use of RRC and DCI is that RRC signaling may be used to enable the relay mode, but a DCI message may be used to switch to joint communication mode (or vice versa). The BS 170 may determine which mode of cooperation should be used based on, for example, measured channel quality (e.g., based on measurements of signal-to-noise ratio, or based on feedback information received from the EDs). For example, if the channel quality between the assisted ED 110*a* and the BS 170 is poor, and the channel quality between the cooperating ED 110*b* and the BS 170 is good, the BS 170 may determine that relay mode should be enabled. In another example, if the channel quality between the assisted ED 110*a* and the BS 170 is good, and the channel quality between the cooperating ED 110*b* and the BS 170 is also good, the BS 170 may determine that joint communication mode should be enabled.

In some examples, enabling and/or switching the mode of cooperation may be via signaling by the assisted ED 110*a*. For example, the assisted ED 110*a* may send a SCI message, and/a PC5 RRC signal, and/or an indication of the mode of cooperation may be carried by a packet sent over the SL interface from the assisted ED 110*a* to the cooperating ED 110*b* (e.g., in media access control (MAC) control element). The assisted ED 110*a* may determine which mode of cooperation should be used based on, for example, measured channel quality and/or traffic factors. For example, if the traffic load at the assisted ED 110*a* is large (e.g., at or above a predefined threshold), the assisted ED 110*a* may determine that joint communication mode should be used. If the traffic load at the assisted ED 110*a* is low (e.g., below a predefined threshold), the assisted ED 110*a* may determine that relay mode should be used. In another example, if low latency is expected or required at the assisted ED 110*a*, the assisted ED 110*a* may determine that joint communication mode should be used. If low latency is not expected or not required at the assisted ED 110*a*, the assisted ED 110*a* may determine that relay mode should be used.

In some examples, a combination of signaling by the BS 170 and signaling by the assisted ED 110*a* may be used. For example, the BS 170 may indicate the mode of cooperation, but the assisted ED 110*a* may override this with a different mode of cooperation.

Different possible ways of signaling the enablement or switching of a mode of cooperation may be used, for example depending on the application. This may provide dynamic and flexible implementation of ED cooperation.

In some examples, the cooperating ED 110*b* may have two different modes of ED cooperation enabled at the same time, in ED-specific or group-specific cooperation.

Figure 10:
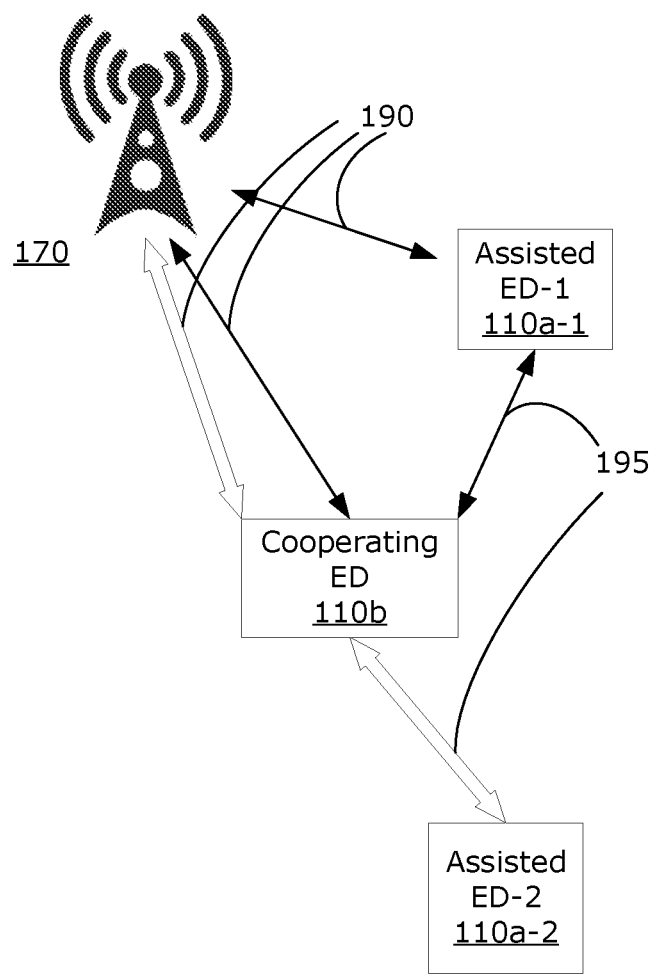
FIG. 10 is a schematic diagram illustrating ED-specific cooperation among EDs.

FIG. 10 shows an example of ED-specific cooperation. In this example, the cooperating ED 110*b* cooperates with a first assisted ED-1 110*a*-1 in joint communication mode (thin black arrows), and at the same time the cooperating ED 110*b* cooperates with a second assisted ED-2 110*a*-2 in relay mode (thick white arrows). The first assisted ED-1 110*a*-1 may have good channel conditions (e.g., good signal-to-noise ratio (SNR)), and the joint communication with the cooperating ED 110*b* may be to improve the throughput. At the same time, the second assisted ED-2 110*a*-2 may have poor or no coverage, and the use of the cooperating ED 110*b* in relay mode may be to improve system coverage.

Although ED-specific cooperation is illustrated in FIG. 10, in other examples the cooperation may be group-specific. That is, the cooperating ED 110*b* may use joint communication mode with one group of assisted EDs 110*a*-1, and at the same time use relay mode with a second group of assisted EDs 110*a*-2. In some examples, a mix of ED-specific and group-specific cooperation may be implemented (e.g., the cooperating ED 110*b* uses joint communication mode with one assisted ED 110*a*-1 and uses relay mode with a group of assisted EDs 110*a*-2). Further, it should be understood that the cooperating ED 110*b* may cooperate with more than two assisted EDs 110*a*-1, 110*a*-2 (or groups of assisted EDs 110*a*-1, 110*a*-2) in ED-specific or group-specific cooperation.

In order to support ED-specific or group-specific modes of cooperation, the indicator for enabling or switching a mode of cooperation may further include identification of the specific assisted ED (e.g., using a sub-group identifier or configured higher layer identifier of the specific ED for generating a reference signal (RS), scrambling sequences, CRC mask or hopping pattern) or identification of the specific group of ED (e.g., using a group identifier of the group of EDs). Such information may be preconfigured or dynamically indicated to the cooperating ED 110*b*, for example. A group-specific mode of cooperation may be enabled using group-based signaling (e.g., group DCI).

For example, the cooperating ED 110*b* may receive a first indicator (e.g., from the BS 170 or from the first assisted ED 110*a*-1) to enable joint communication mode or cooperation with the first assisted ED 110*a*-1. The first indicator may include information identifying the first assisted ED 110*a*-1 (e.g., a device identifier of the first assisted ED 110*a*-1). The cooperating ED 110*b* may also receive a second indicator (e.g., from the BS 170 or from the second assisted ED 110*a*-2) to enable relay mode of cooperation with the second assisted ED 110*a*-2. The second indicator may include information identifying the second assisted ED 110*a*-2 (e.g., a device identifier of the second assisted ED 110*a*-2). Using the received information, the cooperating ED 110*b* may properly determine which mode of cooperation is being used for which set of data shared over the SL. The cooperating ED 110*b* may also use such information to appropriately multiplex data from different sources, as discussed further below. It should be noted that, in some examples, the cooperating ED 110*b* may not require the second indicator to enable the relay mode of cooperation. For example, the cooperating ED 110*b* may use relay mode of cooperation by default.

When the cooperating ED 110*b* cooperates with the two (or more) assisted EDs 110*a* (or two or more groups of assisted EDs 110*a*) for UL communications, the intended recipient for both sets of data (originating from each assisted ED 110*a* or group of ED 110*a*) may be the BS 170 (as shown in FIG. 10). In other examples, each set of data (originating from each assisted ED 110*a* or group of ED 110*a*) may have a different intended recipient (e.g., the BS 170 is the intended recipient for one set of data originating from the first assisted ED 110*a*-1, and another ED (not shown) is the intended recipient for another set of data originating from the second assisted ED 110*a*-2). In the case of DL communications, the cooperating ED 110*b* may transmit different sets of data to different intended recipients (e.g., to the first assisted ED 110*a*-1, and to the second assisted ED 110*a*-2), or the cooperating ED 110*a* may transmit different sets of data to the same intended recipient.

The ability to tailor the mode of cooperation for specific EDs or specific groups of EDs may provide a more flexible mechanism for implementing ED cooperation. For example, the ability to implement ED-specific modes of cooperation may enable the cooperating ED 110*b* to cooperate with a legacy ED (which does not support joint communication mode) using relay mode of cooperation, and to cooperate with a non-legacy ED (which does support joint communication mode) using joint communication mode of cooperation.

Figure 11:
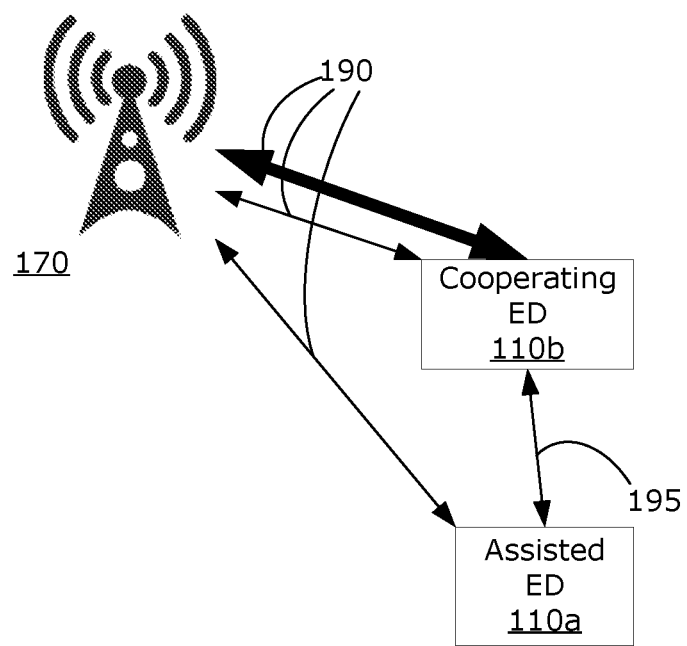
FIG. 11 is a schematic diagram illustrating an example of data being jointly transmitted in joint communication mode.

FIG. 11 shows an example of joint communication. In this example, the cooperating ED 110*b* performs joint communication with the assisted ED 110*a* (thin black arrows), using joint communication mode of cooperation. At the same time, the cooperating ED 110*b* may also transmit its own data over the Uu interface 190 (thick black arrow). In this example, the assisted ED 110*a* may split the data for joint communication. A first portion of the split data is transmitted over the SL interface 195 to the cooperating ED 110*b*, and is forwarded by the cooperating ED 110*b* over the Uu interface 190 to the BS 170 (or to another ED (not shown)). A second portion of the split data is transmitted by the assisted ED 110*a* itself over the Uu interface 190. In some examples, the data may be split over more than two EDs 110. For example, a further third portion of the split data, or a copy of the first portion of the split data, may be shared over the SL interface 195 with another cooperating ED (not shown).

The data may be split in various suitable ways. The data may be split into two or more portions, and the portions may or may not be overlapping (i.e., some of the data may or may not be common between portions). The data may be split at a higher layer (e.g., at the packet data convergence protocol (PDCP) layer or at the MAC layer), or may be split at a lower layer (e.g., at the physical (PHY) layer, such as splitting the data over two or more codewords, over two or more code block groups or over two or more redundancy version (RV) of hybrid automatic repeat request (HARQ) transmission).

Figure 12A:
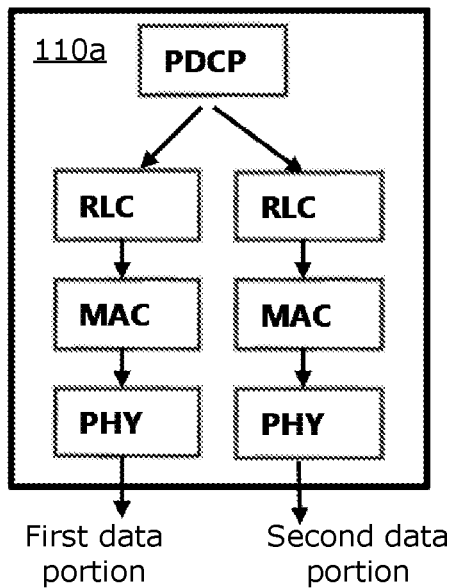
FIGS. 12A-C show some examples of how data splitting may be implemented at the assisted ED.
Figure 12B:
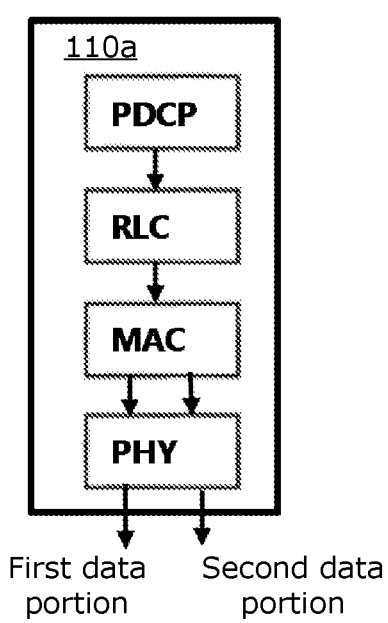
Figure 12C:
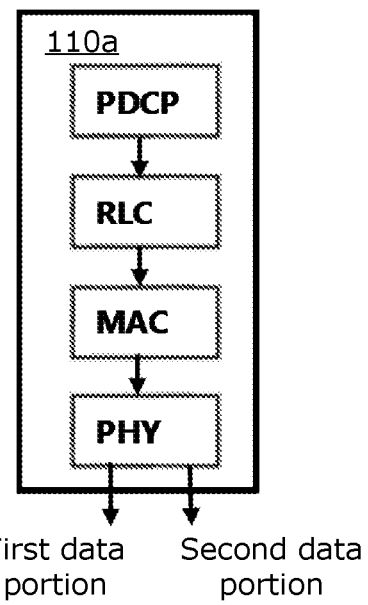

FIGS. 12A-C show some examples of how data splitting may be implemented at the assisted ED 110*a*. For simplicity, the data is shown as being split into two portions, however the data may be split into more than two portions in some examples. Although FIGS. 12A-C show data splitting at the assisted ED 110*a*, for UL communications, data splitting may be similarly implemented at the BS 170, for DL communications.

FIG. 12A shows an example in which data is split into two portions at the PDCP layer. Each portion is then separately processed in the radio link control (RLC), MAC and PHY layers. FIG. 12B shows an example in which data is split into two portions at the MAC layer. FIG. 12C shows an example in which data is split into two portions at the PHY layer. The method in which data is split may impact the ease of reassembling the data at the destination (e.g., at the BS 170). In some examples, the method for splitting data may be specified when the mode of cooperation is indicated (e.g., as part of the signal 605 or 655 described above), may be preconfigured (e.g., using RRC signaling, or defined in standards), may be selected by the data source (e.g., at the assisted ED 110*a*), may be selected dynamically, or a combination of the above, among other possibilities.

Regardless of the mode of cooperation (e.g., relay mode or joint communication mode), the cooperating ED 110*b* may multiplex data from two or more sources when transmitting the data. For example, the cooperating ED 110*b* may multiplex data shared over the SL by the assisted ED 110*a* with data originating from the cooperating ED 110*b* itself, and transmit the multiplexed data over the Uu interface to the BS 170 (or to another ED 110). For DL communications, the cooperating ED 110*b* may multiplex data received over the Uu interface from the BS 170 with data originating from the cooperating ED 110*b* itself. The cooperating ED 110*b* may also multiplex two sets of shared data originating from two different sources (e.g., originating from two different assisted EDs 110*a*).

Figure 13A:
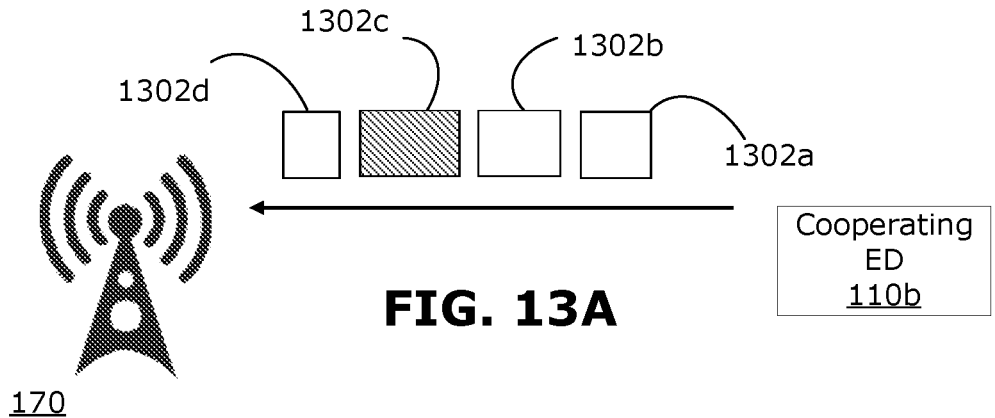
FIGS. 13A-C show some examples of how a cooperating ED may transmit data originating from two different sources.
Figure 13B:
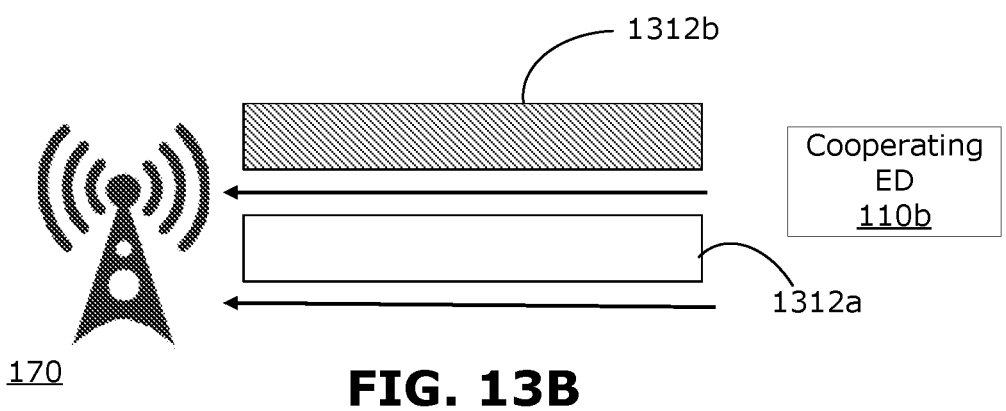
Figure 13C:
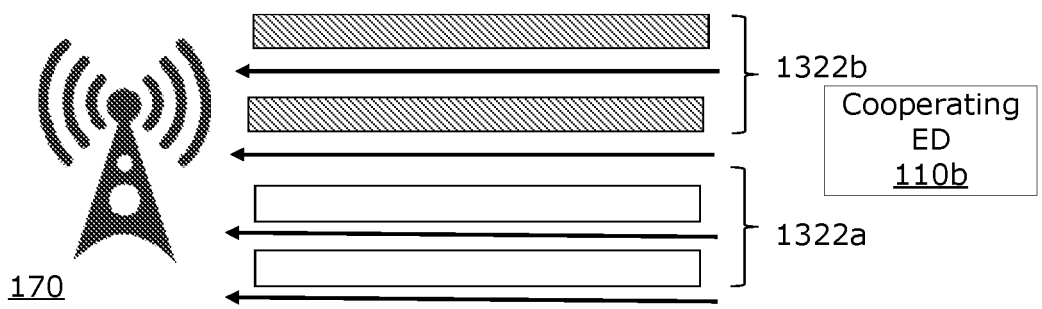

FIGS. 13A-C show some examples of how data may be multiplexed by the cooperating ED 110*b*. In these figures, different shading is used to identify data originating from different sources. For example, unshaded blocks may indicate data originating from the assisted ED 110a and shaded blocks may indicate data originating from the cooperating ED 110b itself. This is only an example, and other sources of the data may be possible. The arrows shown in FIGS. 13A-C indicate the direction of transmission from the cooperating ED 110b to the BS 170. Further, in these figures data from only two different sources have been shown for simplicity. However, data originating from more than two different sources may be multiplexed in similar ways.

In the example of FIG. 13A, data is multiplexed in different code block groups (CBGs). As shown, first, second and fourth CBGs 1302a, 1302b, 1302d are used to carry data originating from a first source (e.g., the assisted ED 110a), and the third CBG 1302c is used to carry data originating from a second source (e.g., the cooperating ED 110b itself).

In the example of FIG. 13B, data is multiplexed in different layers (e.g., using MIMO techniques). As shown, a first layer 1312a is used to carry data originating from first source (e.g., the assisted ED 110a), and a second layer 1312b is used to carry data originating from a second source (e.g., the cooperating ED 110b itself).

In the example of FIG. 13C, data is multiplexed in different codewords. As shown, a first codeword 1322a is used to carry data originating from first source (e.g., the assisted ED 110a), and a second codeword 1322b is used to carry data originating from a second source (e.g., the cooperating ED 110b itself).

Data may also be multiplexed in different transport blocks (not shown).

Data may also be multiplexed in different radio bearers (not shown).

The method for multiplexing data at the cooperating ED 110b may be preconfigured (e.g., defined in a standard, or preconfigured using RRC signaling), or may be determined dynamically. The multiplexing method may be selected by the cooperating ED 110b, or may be indicated by the BS 170 for example.

In order for the recipient (e.g., the BS 170) to correctly process the received data, information about the type of multiplexing used (e.g., including information about which transmission resource carries data from which source) may be explicitly provided. For example, explicit indications may be carried by DCI message or using RRC signaling or other layer mapping or header information to indicate which radio bearer, transport block, codeword, CBG or layer carries data from which source. For example, the BS 170 may specify (e.g., in RRC signaling and/or DCI message) that when joint communication mode is in use data originating from the assisted ED 110a should be carried in the first codeword and data originating from the cooperating ED 110b itself should be carried in the second codeword. The cooperating ED 110b may then multiplex data for transmission accordingly, and the BS 170 may receive the process the multiplex data accordingly.

In some examples, instead of providing such information in an explicit message or control signal, information about the type of multiplexing used may be implicit. For example, blind decoding of the transport blocks, codewords, CBGs or layers may be used to determine the sources of the data. For example, identifying information (e.g., an identifier of the data source, such as a radio network temporary identifier (RNTI), group identifier, device identifier, etc.) may be used in generating cyclic redundancy check (CRC) bits, used in scrambling, or used in the demodulation reference signal (DMRS). The recipient (e.g., BS 170) of the multiplexed data may then use blind decoding to find the identifying information and identify the sources of the respective data. The use of such implicit identification of data may enable multiplexing of data to be performed in a more flexible and dynamic way.

In other examples, the type of multiplexing used and the order in which data is multiplexed may be predefined and known to the recipient ahead of time. For example, which layers to use for carrying data from different sources may be predefined (e.g., specified in a standard).

Multiplexing of data (whether over transport block, codeword, CBG or layer, or any other way) may be performed dynamically. For example, the cooperating ED 110b may perform data multiplexing at a certain time (e.g., if the cooperating ED 110b has data of its own to transmit) and not perform multiplexing at another time (e.g., if the cooperating ED 110b does not have data of its own to transmit). Different types of multiplexing may be used at different times.

In various examples, the present disclosure describes methods and apparatuses that support different modes of ED cooperation. An ED may be configured to support and switch between relay mode or joint communication mode of cooperation. Further, an ED may use ED-specific or group-specific modes of cooperation. In the relay mode, the cooperating ED relays data from another source (e.g., an assisted ED or a BS). In the joint communication mode, the cooperating ED jointly transmits the data with another ED (or BS).

The enabling or switching of ED cooperation, and mode of cooperation may be triggered by the BS and/or by the assisted ED. Different methods for triggering a mode of cooperation (e.g., higher layer signaling, lower layer signaling, etc.) have been described in various examples.

Different examples have been described for performing data splitting. Explicit or implicit signalling may be used to indicate whether data splitting should be used and the type of data splitting to use, or this may be preconfigured.

When data splitting is used for joint communication, the reassembly of the portions of split data may be facilitated by information used to identify the portions (e.g., identifying the portions according to the order in which they should be reassembled).

The present disclosure describes examples in which an ED may be described as a cooperating ED that cooperates with an assisted ED. It should be understood that the roles of cooperating ED and assisted ED are not fixed. For example, an ED that acts as a cooperating ED at one time may act as an assisted ED at another time. Further, a first ED may act as a cooperating ED that cooperates with a second ED in the role of an assisted ED; the first ED may, at the same time, take on the role of an assisted ED and cooperate with a third ED in the role of a cooperating ED. Other such variations may be possible.

Examples that have been described as UL communications to the BS may be adapted for communications in which the destination of the communications is another ED, or another network entity other than the BS. Similarly, examples that have been described as DL communications originating from the BS may be adapted for communications in which the origin of the communications is another network entity other than the BS.

In some examples, the present disclosure describes a method, at a source apparatus, the method including: transmitting data, intended for an intended recipient, to a cooperating device to be further transmitted by the cooperating device to the intended recipient if a mode of cooperation is a relay mode; or transmitting at least a portion of the data, intended for the intended recipient, to at least the cooperating device to be further transmitted by the cooperating device to the intended recipient together with another transmission of at least a same or different portion of the data by another cooperating device or by the source apparatus if the mode of cooperation is a joint communication mode.

In some examples, before the transmitting, the method further includes: receiving an indicator enabling either the relay mode or the joint communication mode, from the intended recipient.

In some examples, the source apparatus is a device and the intended recipient is a base station, wherein the indicator received from the base station is provided in one or more of: a radio resource control (RRC) signal; or a downlink control information (DCI) message.

In some examples, the method further includes: transmitting, to the intended recipient, an indicator of either the relay mode or the joint communication mode.

In some examples, the source apparatus is a base station and the intended recipient is a device, wherein the indicator is transmitted in one or more of: a radio resource control (RRC) signal; or a downlink control information (DCI) message.

In some examples, the method further includes: transmitting an indicator enabling either the relay mode or the joint communication mode to the cooperating device.

In some examples, the source apparatus is a device, and the indicator is transmitted in one or more of: a sidelink control information (SCI) message; a radio resource control (RRC) signal over a sidelink physical layer (PC5); or a packet transmitted over a sidelink interface.

In some examples, the mode of cooperation is determined based on at least one of: channel quality between the source apparatus and the intended recipient; traffic load of the source apparatus or intended recipient; or latency requirement at the source apparatus or intended recipient.

In some examples, the method further includes: if the mode of cooperation is the joint communication mode: splitting the data into two or more portions data; transmitting one of the two or more portions of data to the cooperating device, to be transmitted by the cooperating device to the intended recipient; and performing at least one of: transmitting another of the two or more portions of data to another cooperating device, to be transmitted by the other cooperating device to the intended recipient; or transmitting the other of the two or more portions of data to the intended recipient.

In some examples, splitting the data is performed by one of: splitting the data at a packet data convergence protocol (PDCP) layer; splitting the data at a media access control (MAC) layer; or splitting the data at a physical (PHY) layer.

In some examples, the present disclosure describes a method, at a cooperating device, the method including: receiving a first indicator enabling a first mode of cooperation with a first source apparatus; receiving at least a portion of first data from the first source apparatus; receiving at least a portion of second data from a second source apparatus; and transmitting at least the portion of first data and at least the portion of second data to at least one intended recipient.

In some examples, the method further includes: receiving a second indicator enabling a different second mode of cooperation with the second source apparatus; wherein at least the portion of first data is transmitted using the first mode of cooperation, and at least the portion of second data is transmitted using the second mode of cooperation.

In some examples, the method further includes: in absence of any indicator indicating a mode of cooperation with the second source apparatus, transmitting at least the portion of second data using a second mode of cooperation by default.

In some examples, the first mode of cooperation is a joint communication mode, and the second mode of cooperation is a relay mode.

In some examples, the second source apparatus is the cooperating device.

In some examples, the intended recipient for both at least the portion of first data and at least the portion of second data is a base station, and the first indicator is received from the base station.

In some examples, the intended recipient for at least the portion of first data is different from the intended recipient for at least the portion of second data.

In some examples, at least one intended recipient is a device.

In some examples, the transmitting includes multiplexing at least the portion of first data and at least the portion of second data over respective transmission resources.

In some examples, the transmitting includes multiplexing at least the portion of first data and at least the portion of second data over: different codewords; different transport blocks; different layers; different code block groups; or different radio bearers.

In some examples, the present disclosure describes a method, at a base station, the method including: transmitting a first indicator enabling a mode of cooperation at a source apparatus, the mode of cooperation being either a relay mode of cooperation or a joint communication mode of cooperation; and after transmitting the indicator enabling the relay mode: receiving, from a cooperating device, data originating from the source apparatus; or after transmitting the indicator enabling the joint communication mode: receiving, from the cooperating device, at least a portion of data originating from the source apparatus; and receiving, from at least another device, a different portion of data originating from the source apparatus or a duplicate of at least the portion of data originating from the source apparatus.

In some examples, the other device is another cooperating device, or is the source apparatus.

In some examples, the method further includes: transmitting a second indicator to the cooperating device to enable the mode of cooperation at the cooperating device.

In some examples, the second indicator is transmitted to enable the joint communication mode at the cooperating device, and in absence of the second indicator the relay mode is enabled at the cooperating device by default.

In some examples, the second indicator includes information identifying the source apparatus.

In some examples, the second indicator includes information indicating transmission resources to be used by the cooperating device for transmitting at least the portion of data originating from the source apparatus.

In some examples, the first indicator is transmitted in one or more of: a radio resource control (RRC) signal; or a downlink control information (DCI) message.

In some examples, the present disclosure describes a method, at a base station, the method including: to enable a joint communication mode of cooperation: transmitting a first indicator enabling the joint communication mode of cooperation at an intended recipient; transmitting, to a cooperating device, at least a portion of data originating from the base station; and transmitting, to at least another device, a different portion of data originating from the base station or a duplicate of at least the portion of data originating from the base station; and to enable a relay mode of cooperation: in absence of transmitting the first indicator, transmitting, to the cooperating device, data originating from the base station.

In some examples, the other device is another cooperating device, or is the intended recipient.

In some examples, the method further includes: transmitting a second indicator to the cooperating device to enable the joint communication mode of cooperation at the cooperating device.

In some examples, the present disclosure describes a source apparatus comprising a non-transitory memory storage comprising instructions; and one or more processors in communication with the memory, wherein the one or more processors execute the instructions to implement steps in accordance with any of the methods described herein.

In some examples, the present disclosure describes a cooperating apparatus comprising a non-transitory memory storage comprising instructions; and one or more processors in communication with the memory, wherein the one or more processors execute the instructions to implement steps in accordance with any of the methods described herein.

In some examples, the present disclosure describes a base station comprising a non-transitory memory storage comprising instructions; and one or more processors in communication with the memory, wherein the one or more processors execute the instructions to implement steps in accordance with any of the methods described herein.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, at a source apparatus, the method comprising:
receiving or transmitting a signalling indicating a first configuration of two configurations of cooperation between the source apparatus and at least a first cooperating device, wherein the two configurations of cooperation comprises a joint communication configuration of cooperation and a relay configuration of cooperation;
wherein the first configuration is indicated to be the joint communication configuration of cooperation; and
using the joint communication configuration of cooperation by:
splitting or duplicating data, intended for an intended recipient, into two or more portions of data, wherein the splitting or duplicating is performed at one of a packet data convergence protocol (PDCP) layer, a media access control (MAC) layer or a physical (PHY) layer of the source apparatus;
transmitting one of the two or more portions of data to at least the first cooperating device to be further transmitted by at least the first cooperating device to the intended recipient; and
transmitting another of the two or more portions of data to the intended recipient or to a second cooperating device to be further transmitted by the second cooperating device to the intended recipient.

2. The method of claim 1, further comprising:
determining a second configuration is indicated, from among the two configurations of cooperation, to be the relay configuration of cooperation; and
using the relay configuration of cooperation by:
transmitting data, intended for the intended recipient, to a first cooperating device to be further transmitted by the first cooperating device to the intended recipient.

3. The method of claim 1,
wherein the signalling is received or transmitted in one or more of: a radio resource control (RRC) signal, a downlink control information (DCI) message, a sidelink control information (SCI) message, a RRC signal over a sidelink physical layer (PC5), or a packet transmitted over a sidelink interface.

4. The method of claim 2, further comprising using the relay configuration of cooperation by:
enabling the relay configuration of cooperation at the first cooperating device by:
in absence of receiving or transmitting any signalling, transmitting, to the first cooperating device only, the data originating from the source apparatus.

5. A method, at a cooperating device, comprising:
receiving a first signalling indicating a first configuration of two configurations of cooperation with a first source apparatus, wherein the two configurations of cooperation comprises a joint communication configuration of cooperation and a relay configuration of cooperation, wherein the first configuration is the joint communication configuration of cooperation;

receiving at least a portion of first data from the first source apparatus;

receiving at least a portion of second data from a second source apparatus; and transmitting the at least a portion of first data and the at least a portion of second data to at least one intended recipient by multiplexing the at least a portion of first data and the at least a portion of second data over different respective transmission resources.

6. The method of claim 5, further comprising:

receiving a second signalling indicating a second configuration of the two configurations of cooperation, the second configuration being for cooperation with the second source apparatus, wherein the second configuration is the relay configuration of cooperation;

wherein the at least a portion of first data is transmitted using the joint communication configuration of cooperation, and the at least a portion of second data is transmitted using the relay configuration of cooperation.

7. The method of claim 5, further comprising:

in absence of any signalling indicating a configuration of cooperation with the second source apparatus, transmitting the at least a portion of second data using the relay configuration of cooperation by default.

8. The method of claim 5, wherein the intended recipient for the at least a portion of first data is different from the intended recipient for the at least a portion of second data.

9. The method of claim 5, wherein the different respective transmission resources comprising at least one of the following:

different codewords;
different transport blocks;
different layers;
different code block groups; or
different radio bearers.

10. A method, at a recipient apparatus, comprising:

receiving or transmitting a signalling indicating a first configuration of two configurations of cooperation, wherein the two configurations of cooperation comprises a joint communication configuration of cooperation and a relay configuration of cooperation;

wherein the first configuration is indicated to be the joint communication configuration of cooperation; and using the joint communication configuration of cooperation by:

receiving, from a first cooperating device, at least a first portion of data originating from a source apparatus; and receiving, from at least another device, a different second portion of data originating from the source apparatus or a duplicate of at least the first portion of data originating from the source apparatus;

wherein at least the first portion of data and the different second portion or the duplicate of at least the first portion of data are reassembled at one of a packet data convergence protocol (PDCP) layer; at a media access control (MAC) layer; or at a physical (PHY) layer.

11. The method of claim 10, further comprising:

determining a second configuration is indicated, from among the two configurations of cooperation, to be the relay configuration of cooperation; and using the relay configuration of cooperation by:

receiving, from the first cooperating device, data originating from the source apparatus.

12. The method of claim 10, wherein the signalling is transmitted to at least one of the first cooperating device, the source apparatus, or a second cooperating device.

13. The method of claim 10, wherein the signalling is received or transmitted in one or more of: a radio resource control (RRC) signal, a downlink control information (DCI) message, a sidelink control information (SCI) message, a RRC signal over a sidelink physical layer (PC5), or a packet transmitted over a sidelink interface.

14. The method of claim 13, wherein the signalling indicates the joint communication configuration of cooperation, and wherein the relay configuration of cooperation is enabled at the first cooperating device by default prior to receiving or transmitting the signalling.

15. The method of claim 13, wherein the signalling includes information indicating transmission resources for transmitting at least the portion of data originating from the source apparatus.

16. The method of claim 13, wherein the signalling is received from the source apparatus, the first cooperating device, or the other device.

17. The method of claim 1, wherein the signalling indicates the data is to be split or duplicated, and wherein the splitting or duplicating is performed in accordance with the signalling.

18. The method of claim 5, wherein the second source apparatus is the cooperating device.

19. The method of claim 5, wherein the first signalling indicates at least the portion of first data is split from a larger complete data, the method further comprising labeling at least the portion of first data as split data.

20. The method of claim 10, wherein the portion of data received from the source apparatus and the different portion of data received from the another device are different portions of data split from a larger complete data, the method further comprising identifying the different portions of split data and reassembling the different portions to recover the complete data.

* * * * *